United States Patent
Higuchi et al.

(10) Patent No.: US 11,589,604 B2
(45) Date of Patent: Feb. 28, 2023

(54) COMPOSITION CONTAINING FINE FOOD PARTICULATE COMPLEXES, AND METHOD FOR PRODUCING SAME

(71) Applicant: MIZKAN HOLDINGS CO., LTD., Aichi (JP)

(72) Inventors: Tatsuya Higuchi, Aichi (JP); Junichiro Ihara, Aichi (JP)

(73) Assignee: Mizkan Holdings Co., Ltd., Aichi (JP)

( * ) Notice: Subject to any disclaimer, the term of this patent is extended or adjusted under 35 U.S.C. 154(b) by 575 days.

(21) Appl. No.: 16/549,258

(22) Filed: Aug. 23, 2019

(65) Prior Publication Data

US 2019/0373942 A1    Dec. 12, 2019

Related U.S. Application Data

(63) Continuation of application No. PCT/JP2018/015499, filed on Apr. 13, 2018.

(30) Foreign Application Priority Data

Oct. 3, 2017  (JP) .............................. JP2017-193352

(51) Int. Cl.
| | |
|---|---|
| A23P 10/22 | (2016.01) |
| A23L 7/10 | (2016.01) |
| A23L 13/10 | (2016.01) |
| A23L 19/00 | (2016.01) |

(52) U.S. Cl.
CPC .............. *A23P 10/22* (2016.08); *A23L 7/198* (2016.08); *A23L 13/10* (2016.08); *A23L 19/01* (2016.08); *A23V 2002/00* (2013.01)

(58) Field of Classification Search
CPC .......... A23P 10/22; A23L 7/198; A23L 13/10; A23L 11/00; A23L 19/01; A23V 2002/00
USPC .................. 426/518, 519, 601, 622; 416/615
See application file for complete search history.

(56) References Cited

U.S. PATENT DOCUMENTS

| | | | |
|---|---|---|---|
| 2002/0042393 A1 | 4/2002 | Oobae et al. |
| 2005/0106310 A1 | 5/2005 | Green et al. |
| 2005/0123667 A1 | 6/2005 | Sakuma et al. |
| 2010/0143568 A1 | 6/2010 | Quail et al. |

FOREIGN PATENT DOCUMENTS

| | | |
|---|---|---|
| CN | 1437932 A | 8/2003 |
| JP | 2002001155 A | 1/2002 |
| JP | 2003-144949 A | 5/2003 |
| JP | 2004-159606 A | 6/2004 |
| JP | 2006-141291 A | 6/2006 |
| JP | 2007-268515 A | 10/2007 |
| JP | 2009-543562 A | 12/2009 |
| JP | 2010-023001 A | 2/2010 |
| JP | 4748627 B2 | 8/2011 |
| JP | 2013-85487 A | 5/2013 |
| JP | 2016059384 A | 4/2016 |
| KR | 820000362 B1 | 3/1982 |
| KR | 20040094700 A | 11/2004 |

OTHER PUBLICATIONS

Farmer, Fannie, "Baking Powder Biscuits", pp. 3, 4. https://cookbookcreate.com/recipes/76440-baking-powder-biscuits-fannie-farmer. (Year: 2017).*
Office Action issued in corresponding Korean Application No. 2019-7027710, dated Dec. 13, 2019 (24 pages).
International Search Report issued in International Application No. PCT/JP2018/015499, dated Jul. 17, 2018 (1 page).
Written Opinion issued in International Application No. PCT/JP2018/015499, dated Jul. 17, 2018 (3 pages).
Office Action issued in Taiwanese Patent Application No. 107134739, dated Jan. 30, 2019 (4 pages).
Extended European Search Report issued in corresponding European Application No. 18864601.2; dated Jun. 5, 2020 (8 pages).
Office Action issued in corresponding Brazilian Application No. BR1120190210822; dated Apr. 22, 2020 (15 pages).

* cited by examiner

*Primary Examiner* — Helen F Heggestad
(74) *Attorney, Agent, or Firm* — Osha Bergman Watanabe & Burton LLP

(57) ABSTRACT

A method for producing a food product includes preparing a mixture including one or more dried food ingredients and at least one oil or fat, wherein a total fat content in the mixture is 30% by mass or more, wet pulverizing the dried food ingredients in the mixture, and obtaining a food composition including the at least one oil or fat and 20% to 98% by mass of fine particles of the dried food ingredients. The wet pulverization is performed with a maximum pressure of 0.01 to 1 MPa and under a rising temperature condition satisfying T1+1<T2<T1+50. The fine particles subjected to an ultrasonication treatment have a modal diameter of 0.3 to 200 μm and a decreased maximum particle size. A $10^{th}$ percentile value of a numerical value N for each fine particle complex is 0.40 or less.

10 Claims, No Drawings

COMPOSITION CONTAINING FINE FOOD PARTICULATE COMPLEXES, AND METHOD FOR PRODUCING SAME

TECHNICAL FIELD

One or more embodiments of the present invention relate to a composition containing fine food particulate complexes and a method for producing the same.

BACKGROUND

Conventionally, compositions containing fine food particles having a variety of active ingredients have been desired to be used for diverse purposes. However, such compositions are unstable and a variety of utilization properties also deteriorate gradually in association with change of compositions, and therefore, their application to diverse purposes has been hindered. Conventionally, there has been no composition in which foods can be present stably and which has a variety of utilization properties that enable use for diverse purposes.

A food may be used as a powder composition, but a disadvantage thereof is that such a composition has low stability. Moreover, as a composition containing a food, reports have been made on: for example, a seasoning containing pulverized green and yellow vegetables obtained by pulverizing green and yellow vegetables in the presence of an oil (Patent Literature 1); a spread food obtained by pulverizing a non-nut plant material to generate powder with an average particle diameter of less than about 100 μm, and then subjecting the powder with an average particle diameter of less than about 100 μm to an elevated temperature (Patent Literature 2); and the like. In addition, as a fine pulverization technology of a food, reports have been made on: a paste of a finely pulverized seed with a testa characterized by comprising a testa, a seed and an edible oil and having a 50% integrated diameter (median diameter) of the solid content of 4 to 15 μm (Patent Literature 3); a method for producing an ultrafinely pulverized natural product obtained by ultrafinely pulverizing a natural product having a moisture content of 5% by weight or less and a maxinum particle size of 5,000 μm or less in an organic medium into a maximum particle size of 30 μm or less through one step pulverization with an ultrafine pulverizing machine having a grinding function (Patent Literature 4); and a method for producing an ultrafinely pulverized product of a natural product characterized by that the finely pulverized product having a largest particle diameter of 100 μm or less is obtained through one step wet pulverization using a whole substance of a natural product in the dry state as a raw material and an ultrafine pulverizing machine having a grinding function (Patent Literature 5). Furthermore, inventions for reducing the number of aggregates have been reported, such as a method foe producing a fine particle dispersion obtained by subjecting an aggregated pulverulent body of fine particles to a wet pulverization and carrying out the pulverization while suppressing re-aggregation of the pulverized fine particles (Patent Literature 6).

CITATION LIST

Patent Literature

Patent Literature 1: JP-A-2006-141291
Patent Literature 2: JP-A-2009-543562
Patent Literature 3: JP-A-2004-159606
Patent Literature 4: JP-A-2003-144549
Patent Literature 5: JP-A-2007-268515
Patent Literature 6: JP-A-2010-023001

However, in the means of Patent Literature 1, the food obtained includes a large amount of water originating from vegetables and the composition becomes destabilized due to the large amount of water, and therefore, the issue in the stability has not been solved. In the method of Patent Literature 2, a desired nut flavor is generated by subjecting the powder that has been finely pulverized to a further elevated temperature, and therefore, the stability of the composition is impaired due to an excessive heating, which is not preferable. As such, even these means could not achieve a composition in which diverse foods can be present stably and which has a variety of utilization properties that enable use for diverse purposes. In addition, Patent Literatures 3 to 5 all describe technologies of carrying out the pulverization until the particle size becomes considerably small, and they are unsatisfactory in terms of the stability and the applicability to diverse foods of the composition and are not a technological idea of forming a complex of finely pulverized products, either. Moreover, although Patent Literature 6 is a technology for suppressing re-aggregation of the pulverized fine particles, the dispersion obtained has an insufficient stability, and this technology is not applicable to foods because a silane coupling agent is used as a dispersing agent.

SUMMARY

Accordingly, one or more embodiments of the present invention provide a composition in which foods can be present stably and which has a variety of utilization properties that enable use for diverse purposes.

The present inventors have thus examined various means for providing a composition in which foods can be present stably and which has a variety of utilization properties that enable use for diverse purposes. Then, the present inventors have found that when a food is pulverized and made into fine particles to provide a composition, these fine particles form a complex with a certain size and the complex has a property to be readily disintegrated with an ultrasonication, and that when the composition before the disintegration has fine particles with a particular shape, diverse foods are stably retained therein and a specific texture is imparted thereto, providing the composition with industrially preferable properties. In particular, the fine particulate complex contained in the composition of one or more embodiments of the present invention has a characteristic shape different from a normal one, such as a shape with large roughness, a shape apart from a perfect circle, and an elongated shape. The way how a fine particulate complex having such a shape is formed is not certain, but for example, there is possibility that when a food is treated with a high shear force under a pressurized condition and under a rising temperature condition for a short period of time, re-aggregation of finely pulverized particles occurs and a peculiar shape characteristic defined in one or more embodiments of the present invention is thus obtained. Conventionally, this knowledge that, by carrying out a treatment under such peculiar conditions until the fine particulate complex attains a particular shape property due to re-aggregation, useful effects as shown in one or more embodiments of the present invention can be obtained has not been known at all.

The present inventors have found that when a composition contains fine particles of diverse seeds, grains, legumes, vegetables, fruits, algae and the like and an oil/fat at a certain quantitative ratio, by adjusting properties such as the water content of the composition and the modal diameter of the composition, diverse seeds, grains, legumes, vegetables, fruits, algae and the like are stably retained in the oil/fat and the composition can be used for diverse purposes, providing the composition with industrially preferable properties.

That is, one or more embodiments of the present invention provide the following.

[1] A composition comprising fine food particulate complexes, wherein
(1) a maximum particle size before an ultrasonication is larger than 100 μm;
(2) when the ultrasonication is carried out, a maximum particle size after the treatment decreases by 10% or more as compared with that before the treatment;
(3) when the ultrasonication is carried out, a modal diameter after the treatment is 0.3 μm or more and 200 μm or less; and
(4) when 10,000 fine particles and/or fine particulate complexes in the composition before the ultrasonication are subjected to analysis with a particle shape image analyzer, a $10^{th}$ percentile value of a numerical value N for each fine particle and/or fine particulate complex, which is determined in accordance with a calculation formula described below, is 0.40 or less:

$$N=(\text{roughness}\times\text{circularity})/\text{aspect ratio}.$$

[2] The composition according to [1], wherein the number of particles satisfying (A) and (B) described below is 1% or more when particles in the composition before the ultrasonication are subjected to analysis with a particle shape image analyzer:
(A) an envelope perimeter of a particle in a planar image is 95% or less of a perimeter; and (B) an envelope area of a particle in a planar image is 200 μm² or less.

[3] The composition according to [1] or [2], wherein, when the ultrasonication is carried out, a specific surface area per unit volume after the treatment is 0.10 m²/mL or more, and the specific surface area per unit volume after the treatment increases by 1.6 times or more compared with that before the treatment.

[4] The composition according to any one of [1] to [3], wherein a water content is 20% by mass or less.

[5] The composition according to any one of [1] to [4], wherein, when the ultrasonication is carried out, the maximum particle size after the treatment decreases in the range of 30% or more and 95% or less compared with that before the treatment.

[6] The composition according to any one of [1] to [5], wherein a modal diameter before the ultrasonication is 20 μm or more and 400 μm or less.

[7] The composition according to any one of [1] to [6], wherein a content of the fine food particle is 20% by mass or more and 98% by mass or less.

[8] The composition according to any one of [1] to [7], wherein a total oil/fat content is 30% by mass or more.

[9] The composition according to any one of [1] to [8], wherein the food is one or more selected from the group consisting of seeds, grains, legumes, vegetables, fruits, spices, animals and algae.

[10] The composition according to any one of [1] to [9], wherein the fine food particulate complex is obtained by pulverizing a food having a water activity value of 0.95 or less.

[11] The composition according to [10], wherein the pulverizing processing is a medium stirring mill processing and/or a high-pressure homogenizer processing.

[12] The composition according to [10] or [11], wherein the pulverizing processing is a wet pulverizing processing.

[13] A food/drink product comprising the composition according to any one of [1] to [12].

[14] A liquid seasoning comprising the composition according to any one of [1] to [12].

[15] A method for producing the composition according to any one of [1] to [9], comprising pulverizing a food having a water activity value of 0.95 or less.

[16] The method according to [15], wherein the pulverizing processing is a medium stirring mill processing and/or a high-pressure homogenizer processing.

[17] The method according to [15] or [16], wherein the pulverizing processing is a wet pulverizing processing.

[18] A method for improving a light resistance of a composition containing fine food particulate complexes, the method comprising preparing a composition comprising a fine food particulate complex satisfying the following (1) to (3) by pulverizing a food:
(1) a maximum particle size before an ultrasonication is larger than 100 μm;
(2) when the ultrasonication is carried out, a modal diameter after the treatment is 0.3 μm or more and 200 μm or less; and
(3) when 10,000 fine particles and/or fine particulate complexes in the composition before the ultrasonication are subjected to analysis with a particle shape image analyzer, a $10^{th}$ percentile value of a numerical value N for each fine particle and/or fine particulate complex, which is determined in accordance with a calculation formula described below, is 0.40 or less:

$$N=(\text{roughness}\times\text{circularity})/\text{aspect ratio}.$$

[19] A method for improving a color stability during storage of a composition containing fine food particulate complexes, the method comprising preparing a composition comprising a fine food particulate complex satisfying the following (1) to (3) by pulverizing a food:
(1) a maximum particle size before ultrasonication is larger than 100 μm;
(2) when the ultrasonication is carried out, a modal diameter after the treatment is 0.3 μm or more and 200 μm or less; and
(3) the number of particles satisfying (A) and (B) described below is 1% or more when the composition is subjected to analysis with a particle shape image analyzer:
(A) an envelope perimeter of a particle in a planar image is 95% or less of a perimeter; and (B) an envelope area of a particle in a planar image is 200 μm², or less.

[20] A composition containing fine food particulate complexes, wherein
(1) a maximum particle size before ultrasonication is larger than 100 μm;
(2) when the ultrasonication is carried out, a maximum particle size after the treatment decreases by 10% or more compared with that before the treatment;
(3) when the ultrasonication is carried out, a modal diameter after the ultrasonication is 0.3 μm or more and 200 μm or less; and
(4) the number of particles satisfying (A) and (B) described below is 1% or more when particles in the composition before the ultrasonication are subjected to analysis with a particle shape image analyzer:
(A) an envelope perimeter of a particle in a planar image is 95% or less of a perimeter; and (B) an envelope area of a particle in a planar image is 200 μm² or less.

[21] A method for producing a composition containing fine food particulate complexes, wherein a dry food is subjected to a wet pulverizing processing with a medium stirring mill under a pressurized condition with a maximum pressure of 0.01 MPa or more and 1 MPa or less and under a rising temperature condition within the range where, compared with a treatment temperature immediately after initiation of the treatment (T1), a treatment temperature upon termination of the treatment (T2) satisfies "T1+1<T2<T1+50," and a composition containing fine food particulate complexes having the following characteristics is produced:
(1) a maximum particle size before ultrasonication is larger than 100 μm;
(2) when the ultrasonication is carried out, a maximum particle size after the treatment decreases by 10% or more compared with that before the treatment;
(3) when the ultrasonication is carried out, a modal diameter after the treatment is 0.3 μm or more and 200 μm or less;
(4) when 10,000 fine particles and/or fine particulate complexes in the composition before the ultrasonication are subjected to analysis with a particle shape image analyzer, a $10^{th}$ percentile value of a numerical value N for each fine particle and/or fine particulate complex, which is determined in accordance with a calculation formula described below, is 0.40 or less:

N=(roughness×circularity)/aspect ratio;

(5) a water content is 20% by mass or less;
(6) a total oil/fat content is 30% by mass or more; and
(7) a content of the fine food particle is 20% by mass or more and 98% by mass or less.

According to one or more embodiments of the present invention, a composition with a variety of utilization properties, in which diverse foods are stably retained and to which a specific texture is imparted, is provided.

DETAILED DESCRIPTION OF EMBODIMENTS

Hereinafter, examples of embodiments of the present invention will be described, but the present invention is not limited to these aspects and can be implemented with an arbitrary modification as long as it does not depart from the spirit of the present invention.

A composition containing fine food particles of one or more embodiments of the present invention is a composition containing fine food particulate complexes with the following characteristics:
(a) a maximum particle size before ultrasonication is larger than 100 μm;
(b) when the ultrasonication is carried out, a maximum particle size after the treatment decreases by 10% or more compared with that before the treatment;
(c) when the ultrasonication is carried out, a modal diameter after the treatment is 0.3 μm or more and 200 μm or less; and
(d) when 10,000 fine particles and/or fine particulate complexes in the composition before the ultrasonication are subjected to analysis with a particle shape image analyzer, a $10^{th}$ percentile value of a numerical value N for each fine particle and/or fine particulate complex, which is determined in accordance with a calculation formula described below, is 0.40 or less:

N=(roughness×circularity)/aspect ratio.

Recently, researches on the fine pulverization technology have been actively conducted because it alters physical properties of the material and remarkably expands the application range. In the food field as well, researches on the fine pulverization technology have been actively conducted, but there has been an issue that the fine pulverization increases the surface area of the food, and therefore, the frequency of contact with oxygen or water is increased and the quality degradation is promoted. In other words, according to one or more embodiments of the present invention, a composition whose quality is unlikely to be degraded while having characteristics of a composition containing fine food particulate complexes can be provided. The reason behind this is not clear, but in the composition, a complex in which multiple fine food particles are accumulated is formed. When such a structure is taken, it is believed that the quality degradation during storage is reduced because the surface area of fine food particles is made smaller, and that a specific texture, as if the complex breaks softly in the mouth, is exhibited because the complex collapses during eating due to an exquisite collapsibility it has.

The food (food material), which is the raw material of fine food particles used in one or mere embodiments of the present invention, may be anything as long as it is a food suited for eating and drinking, and is one or more selected from the group consisting of vegetables (including tubers and mushrooms), fruits, spices, algae, grains, seeds, legumes, fishery products and animals. These food materials may be used as a whole together with an inedible part such as peel and pip, or their processed products (including those subjected to a pretreatment such as heat cooking, removal of harshness, peeling, removal of seed, ripening, salting and pericarp processing) may be used, but it is preferable to remove an inedible part and use an edible part.

Any vegetables can be used as long as they are consumable as food and, in particular, radish, carrot, burdock, rutabaga, beet (preferably beetroot: a variety modified such that the root of beets becomes edible), parsnip, turnip, black salsify, sweet potato, cassava, yacon, taro, aroid, konjac yam, tashiroimo (Polynesian arrowroot), lotus root, potato, purple sweet potato, Jerusalem artichoke, kuwai, shallot, garlic, rakkyou, lily bulb, adder's-tongue, kale, yam, yamanoimo, nagaimo, onion, asparagus, udo, cabbage, lettuce, spinach, Chinese cabbage, rape, komatsuna, bok choy, leek, spring onion, nozawana, butterbur, fudansou (swiss chard), potherb mustard, tomato, eggplant, pumpkin, bell pepper, cucumber, Japanese ginger, cauliflower, broccoli, edible chrysanthemum, bitter melon, okra, artichoke, zucchini, sugar beet, ginger, perilla, wasabi, paprika, herbs (watercress, coriander, water spinach, celery, tarragon, chives, chervil, sage, thyme, laurel, parsley, mustard green (leaf mustard), Japanese ginger, mugwort, basil, oregano, rosemary, peppermint, savory, lemongrass, dill, wasabi leaf, leaf of Japanese pepper, and stevia), bracken, Asian royal fern, kudzu, tea plant (tea), bamboo shoot, shiitake, matsutake, Jew's ear, hen of the woods, polypore, oyster mushroom, king trumpet mushroom, enokitake, shimeji, honey mushroom, common mushroom, butterscotch mushroom, Jersey cow mushroom, hatsutake, chichitake and the like can be preferably used. Moreover, carrot, pumpkin, tomato, paprika, cabbage, beet, beet root, onion, broccoli, asparagus, purple sweet potato, and sweet potato are particularly preferable, and carrot, pumpkin, tomato, paprika, beet (preferably beetroot) and broccoli are most preferable.

Any fruits may be employed as long as they are consumable and, in particular, Chinese quince, Chinese white pear, pear, quince, medlar, juneberry, shipova, apple, American cherry (black cherry, dark cherry), apricot, plum, cherry (sweet cherry), sour cherry, blackthorn, Japanese plum, peach, gingko, chestnut, chocolate vine, fig, persimmon, black currant, raspberry, kiwifruit (kiwi), oleaster, mulberry, cranberry, cowberry, pomegranate, hardy kiwi, sea buckthorn (saji, hippophae, seaberry), gooseberry, jujube, Japanese bush cherry, honeysuckle, bilberry, red currant, grape, blackberry, blueberry, pawpaw, matsubusa, raspberry, Nanking cherry, mandarin orange, kumquat, trifoliate orange, olive, loquat, wax myrtle, monk fruit, tropical fruits (such as mango, mangosteen, papaya, cherimoya, atemoya, banana, durian, star fruit, guava, pineapple, acerola, passion fruit, dragon fruit, litchi, and canistel), strawberry, watermelon, melon, avocado, miracle fruit, orange, lemon, prune, yuzu citron, sudachi citron, grapefruit, bitter orange, shiikwaasa and the like can be preferably used. Among them, avocado, apple and the like are particularly preferable.

Any algae may be employed as long as they are consumable, such as large algae, e.g., kelp, wakame, nori, green laver, and gelidiaceae, and microalgae such as green algae, red algae, blue-green algae, dinoflagellate, and euglena. In particular, sea lettuce, green laver, anaaosa, sea grape (kubirezuta), katashiogusa, kubirezuta, kuromiru, tamamiru, Japanese sea lily, hitoegusa, hiraaonori, fusaiwazuta, gutweed, akamoku, amijigusa, sea oak, antokume, ishige, ichimegasa, iroro, iwahige, umi toranoo, umi uchiwa, oobamoku, Okinawa mozuku, kaigaraamanori, kagomenori, kajime (sea oak), kayamonori, gibasa (akamoku, ginnbasou, jinbasou, jibasa), sanadagusa, shiwanokawa, shiwayahazu, European hanover, tsuruarame, nanori (kayamonori), nebarimo, nokogirimoku, habanori, hijiki, hirome, fukuronori, futomozuku, hondawara, makonbu, hornwort, mugiwaranori (kayamonori), muchimo, mozuku, yuna, wakame, asakusanori, ibotsunomata, ushikenori, usukavakaninote, ezotsunomata (kurohaginansou), oobusa, ogonori, okitsunori, obakusa, katanori, kabanori, kamogashiranori, kijinoo, kurohaginansou (ezotsunomata), sakuranori, shiramo, tanbanori, tsunomata, tsurushiramo, tsurutsuru, tosakanori, tosakamatsu, nogenori (fukurofunori), nori (susabinori), hanafunori, harigane, hiragaragara, hirakusa, hiramukade, pirihiba, fukurofunori, fushitsunagi, makusa, marubaamanori, mitsutesozo, euglena, chlorella, mirin, mukadenori, yuikiri, yukari, agar and the like can be used. Among them, kelp, nori, green algae, and the like are particularly preferable.

Any seeds may be employed as long as they are consumable, such as almond, cashew nut, peccan (pecan), macadamia nut, pistachio, hazelnut, coconut, pine nut, sunflower seed, pumpkin seed, watermelon seed, chinquapin, walnut, chestnut, ginkgo, sesame, Brazil nut and the like. Among them, almond, cashew nut, macadamia nut, pistachio, hazelnut, coconut and the like are preferable.

Any legumes may be employed as long as they are consumable, such as common bean, kidney bean, red kidney bean, white pea bean, black bean, mottled kidney beans, tiger bean, lima bean, scarlet runner bean, field pea (in particular, green pea, which is an immature seed), pigeon pea, mung bean, cowpea, adzuki bean, broad bean, soybean (in particular, green soybean), chickpea, Lens culinaris, Lens esculenta, lentil, peanut, lupine, grass pea, locust bean (carob), petai, Néré, coffee bean, cacao bean, Mexican jumping bean and the like. Among these, field pea (in particular, green pea, which is an immature seed), soybean and the like are preferable. In addition, cacao mass can also be used as a processed product of cacao bean, but since the hull and germ are removed during the production step and fermentation is also conducted during the production step, it is hard to feel the original flavor of cacao bean, and it is thus preferable to use those other than cacao mass.

Any grains may be employed as long as they are consumable, such as corn (in particular, sweet corn is preferable), rice, wheat, barley, sorghum, oat, triticale, rye, buckwheat, fonio, quinoa, Japanese barnyard millet, foxtail millet, proso millet, giant corn, sugar cane, amaranthus and the like.

Any spices may be employed, such as white pepper, red pepper, cayenne pepper, horseradish (western wasabi), mustard, poppy seed, nutmeg, cinnamon, cardamon, cumin, saffron, allspice, clove, Japanese pepper, orange peel, fennel, liquorice root, fenugreek, dill seed, Sichuan pepper, long pepper, olive fruit and the like.

Any animals may be employed, such as cattle, pig, horse, goat, sheep, reindeer, buffalo, yak, camel, donkey, mule, rabbit, chicken, duck, turkey, guinea fowl, goose, quail, rock pigeon, wild boar, deer, bear, rabbit, hybrid between wild boar and pig, ostrich, whale, dolphin, northern sea lion, alligator, snake, frog, rice grasshopper, bee larva, silkworm, plecoptera larva and the like. Among these, it is economically preferable to use farm animals such as cattle, pig, horse, sheep or chicken.

Any fishery products, so-called seafoods may be used, such as fishes including cartilaginous fishes and bony fishes; jawless vertebrates including lamprey; shellfishes including ascidian and scallop; cephalopods including octopus and squid; echinoderms including urchin and sea cucumber; arthropods including red king crab; crustaceans including shrimp and crab; cnidarians including jellyfish; and processed marine products obtained by processing their eggs, internal organs or edible parts (such as salmon roe, cod roe, sharkskin and shellfish mantle).

Among the food materials described above, for microalgae such as chlorella, which has a very strong cell wall, it is hard to adjust the particle shape, and therefore, it is convenient to use food materials other than microalgae.

Among the food materials described above, it is preferable to use seeds, grains, legumes, vegetables, fruits, spices, animals and algae, and it is further preferable to use grains, seeds, legumes and animals. In particular, for grains, seeds and legumes, it is easy for the quality of the food material to be degraded, and therefore, the technology of suppressing quality degradation according to one or more embodiments of the present invention can be preferably used. That is, as long as the composition of one or more embodiments of the present invention contains a food defined in one or more embodiments of the present invention (preferably, seeds, grains, legumes, vegetables, fruits, spices, animals and algae, more preferably, grains, seeds, legumes and animals, and further preferably, grains, seeds and legumes) in a defined amount as an insoluble component (an insoluble component in the composition), the composition may contain another insoluble component in addition to that. However, effects of one or more embodiments of the present invention are exerted in an aspect where the weight of the food of one or more embodiments of the present invention (preferably, seeds, grains, legumes, vegetables, fruits, spices, animals and algae, more preferably, grains, seeds, legumes and animals, and further preferably, grains, seeds and legumes) accounts for 30% by mass or more relative to the total weight of insoluble components in the composition, and thus, an aspect in which the food of one or more embodiments of the present invention accounts for 30% by mass or more is preferable. In an aspect in which the food accounts for 50% by mass or more, the effects are exerted more readily, and this aspect is thus more preferable. An aspect in which the food accounts for 70% by mass or more is further preferable, an aspect in which the food accounts for 90% or more is further preferable, and an aspect in which the food accounts for 100% is most preferable. For example, when a composition contains 20 parts by mass of fine food particles originating from a dried product of avocado, which belongs to seeds, as an insoluble component, 30 parts by mass of sugar, which is another food material, and 50 parts by mass of an oil/fat, sugar is not dissolved in the oil/fat in the composition, and therefore, the percentage of the food (avocado: 20% by mass) in the insoluble components (dried avocado+sugar: 50% by mass) is 40% by mass.

One or more embodiments of the present invention encompass an aspect in which the composition does not contain vegetables, an aspect in which the composition does not contain fruits, an aspect in which the composition does not contain animals, an aspect in which the composition does not contain algae, an aspect in which the composition does not contain spices, and a combination of these aspects without food materials (such as an aspect in which the composition does not contain vegetables and fruits, an aspect in which the composition does not contain vegetables, fruits and animals, an aspect in which the composition does not contain vegetables, fruits, animals and algae, an aspect in which the composition does not contain vegetables, fruits, animals, algae and spices).

One of these food materials may be used singly, or two or more of them may be used in combination.

It is preferable to use a dried food as the food material described above. With respect to the quality of the dried food, 0.95 or less of the water activity of the food (food material) is preferable because fine particles after fine pulverization tend to form the complex according to one or more embodiments of the present invention, and 0.9 or less is more preferable, 0.8 or less is more preferable, and 0.65 or less is further preferable. The water activity can be measured by using in accordance with a conventional method using a general water activity measuring apparatus. The water activity of general fruits and vegetables is larger than 0.95, and it is thus preferable to carry out a drying treatment when they are used for one or more embodiments of the present invention. In addition, since storage management becomes easier, the water activity of the food is preferably 0.10 or more, more preferably 0.20 or more, further preferably 0.30 or more, and most preferably 0.40 or more.

Moreover, when a dried food is used as the food material, a method in which a food material that has been subjected to a drying treatment in advance is used is preferable. The drying method of the food material may be any method generally used for drying of foods, and mention may be made of, for example, drying methods through sun drying, drying in shade, freeze-drying, air-drying (hot air drying, fluid bed drying method, spray-drying, drum drying, low temperature drying and the like), press drying, reduced-pressure drying, fine wave drying, hot oil drying and the like. However, it is further preferable to use methods through air-drying or freeze-drying because the degree of change in color or flavor that the food material originally has is small and smells other than the food (scorched flavor and the like) are unlikely to occur.

Furthermore, it is further preferable to carry out the fine pulverization processing in the presence of an oil/fat, by using a food material that has been subjected to a drying treatment in advance.

The composition of one or more embodiments of the present invention is present in the form of a composition containing a complex of fine food particles that have been subjected to a pulverizing processing, that is, in the form of fine particles obtained by subjecting a food to a pulverizing processing to make it into fine particles. Note that the fine particles described above may be formed only of one or two or more foods, but they may also be formed of one or two or more foods and one or two or more other components. Furthermore, in the composition according to one or more embodiments of the present invention, multiple fine food particles mentioned above aggregate and form a complex that can be disintegrated by disturbance. That is, the composition of one or more embodiments of the present invention contains a complex of fine food particles. As mentioned above, the composition of one or more embodiments of the present invention contains fine food particles in the form of a complex, and thus has a satisfactory storage stability and a satisfactory texture is obtained. Note that, unless otherwise noted herein, ultrasonication is assumed as a typical example for the exterior disturbance that disintegrates the fine particulate complex. In one or more embodiments of the present invention, unless otherwise indicated, the "ultrasonication" represents a treatment in which an ultrasonic wave with a frequency of 40 kHz is applied to a measurement sample at an output of 40 W for 3 minutes.

In the composition according to one or more embodiments of the present invention, if the fine pulverization is carried out until the maximum particle size before the ultrasonication becomes 100 μm or less, the structure of the food material is destroyed to give an unfavorable flavor. Therefore, a method in which the fine pulverization is carried out such that the maximum particle size before the ultrasonication is larger than 100 μm is preferable. For measurement of the maximum particle size, a method in which measurement is carried out by using a laser diffraction type particle size distribution measuring apparatus, which will be mentioned later, is preferable.

The composition of one or more embodiments of the present invention is a muddied system and it is hard to visually determine the maximum particle size, but it is believed that there is high probability for a composition containing particles whose maximum particle size before the ultrasonication is larger than 100 μm to contain particles whose maximum particle size observed with the naked eyes under fine scope is larger than 100 μm.

In one or more embodiments of the present invention, it is preferable for the maximum particle size after the ultrasonication to decrease by 10% or more compared with that before the treatment from the viewpoint that the collapsibility in the mouth becomes satisfactory, and it is further preferable to decrease by 20% or more, further preferable to decrease by 30% or more, further preferable to decrease by 40% or more, and most preferable to decrease by 50% or more. Moreover, when the decreasing rate of the maximum particle size around the ultrasonication is larger than 95%, the texture becomes rather powdery, and therefore, the decreasing rate of the maximum particle size via the ultrasonication is preferably 95% or less and further preferably 90% or less. The "percentage by which the maximum particle size after the ultrasonication decreases compared with that before the treatment (the decreasing rate of the maximum particle size)" represents a value obtained by subtracting from 100% the proportion expressing "the maximum particle size after the ultrasonication with a frequency of 40 kHz and an output of 40 W for 3 minutes/the maximum particle size before the ultrasonication" in %. For example, when the maximum particle size before the ultrasonication in a composition is 200 μm and the maximum particle size after the ultrasonication is 150 μm, the percentage by which the maximum particle size of the composition after the ultrasonication decreases compared with that before the treatment (the decreasing rate of the maximum particle size) is 25%.

Furthermore, the maximum particle size in one or more embodiments of the present invention can be measured by using a laser diffraction type particle size distribution measuring apparatus, which will be mentioned later, and by using a particle size for each measurement channel described in Table 1 as the standard, under the same condition as the modal diameter or the like. That is, the % particle frequency for each channel can be determined by measuring, for each channel, the frequency of particles whose particle size is not more than the particle size defined for each channel and larger than the particle size defined for the next channel (for the largest channel within the measuring range, a particle size at the measuring lower limit), and by using the total frequency of all channels within the measuring range as a denominator. Specifically, with respect to the results obtained by measuring the % particle frequency for each of 132 channels below, among channels in which the % particle frequency was confirmed, the particle size of a channel for which the maximum particle size is defined was employed as the maximum particle size. That is, a preferable measuring method in measuring the composition containing fine food particulate complexes of one or more embodiments of the present invention using a laser diffraction type particle size distribution measuring apparatus is as follows: "with a laser diffraction type particle size distribution measuring apparatus, quickly after introducing a sample, the particle size is measured by using 95% ethanol as a measuring solvent and targeting the measuring upper limit of 2,000.00 µm and the measuring lower limit of 0.021 µm. For a sample to which ultrasonication is carried out, ultrasonication with a frequency of 40 kHz and an output of 40 W for 3 minutes is carried out."

While the complex in the composition of one or more embodiments of the present invention collapses during being eaten, it is preferable for the complex to become fine particles after its collapse, and as an indication for this, it is preferable that the composition before the ultrasonication contain a certain number or more of particles with a particular size and shape. That is, since the color stability during storage is improved, it is preferable that the composition be adjusted such that it contains 1% or more of particles satisfying (A) and (B) described below in a planar image when the composition before the ultrasonication is subjected to analysis with a particle shape image analyzer (that is, among 10,000 particles, the number of particles satisfying (A) and IB) is 100 or more). The content ratio of such particles is further preferably 2% or more, more preferably 3% or more, more preferably 4% or more, and most preferably 6% or more. Moreover, when the content ratio of such particles is 25% or more, an unfavorable flavor originating from the food material tends to be imparted, and therefore, the content is further preferably less than 25%, and further preferably less than 16%:

(A) the envelope perimeter of a particle in a planar image is 95% or less of the perimeter; and (B) the envelope area of a particle in a planar image is 200 $\mu m^2$ or less.

Here, the condition (A) means that, since the envelope perimeter is 95% or less of the perimeter, the particle is not circular or elliptical in a planar image and has many irregularities. The condition (B) means that, since the envelope area in a planar image is 200 $\mu m^2$ or less, assuming that the particle is circular in the planar image, the particle size is about 15.9 µm or less. When such particles, which are small and have irregularities, are present at s certain proportion or more in the composition before the ultrasonication, a specific texture, as if the composition breaks softly in the mouth, is obtained.

The planar image analysis with a particle shape analyzer upon carrying out analysis of "the number of particles with a particular shape" in the composition of one or more embodiments of the present invention before the ultrasonication can be carried out according to, for example, the following method.

As the particle shape image analyzer for carrying out analysis of the number of particles, anything can be used as long as it has a function of being capable of photographing a general image of an individual particle to analyze its particle shape, but for example, the analysis is preferably carried out by using a particle analyzer through dynamic image analysis method (for example, PITA-3 from SEISKIN ENTERPRISE Co., Ltd.) where particles are randomly extracted and a large amount of information regarding individual particles can be automatically obtained in a short period of time by allowing a suspension of particulate objects to flow in a flow cell, and automatically determining and analyzing particles that come into the photographing visual field.

Upon the analysis of the number of particles, the image needs to be analyzed from a comprehensive viewpoint, and therefore, as a camera for photographing an image of particles, an imaging camera (CCD camera or C-MOS camera) that can acquire a planar image on which particles are present with effective pixels of 1,392 (H)×1,040 (V) and with pixels coarser than the pixel size of approximately 4.65×4.65 µm is preferable, and for example, CM-140MCL (from Japan Analytical Industry Co., Ltd.) can be used. As an objective lens for photographing images of particles, the one with a magnification of 4 was used, and images of particles were photographed while allowing a sample to flow at an appropriate flow rate. In particular, for the shape of the flow cell, it is preferable to use a planarly extended cell, which can enhance planar extension effects and have the center of most of particles in the composition before the ultrasonication pass within the focus range that the lens has, thereby enabling acquisition of the exact number of particles. In photographing of images of particles, conditions for the particle image analyzer were set to a degree where the focus is appropriately set, the particle shape can be clearly confirmed, and the contrast with the background is sufficient such that particles can be clearly distinguished from the background. For example, as a setting example of analysis conditions after acquisition of images of particles, when an imaging camera of 8-Bit grayscale (where 0 is black and 255 is white) is used, planar images on which particles are present can be acquired with a LED strength of 110 and a camera gain of 100 db, and then, among them, images of individual particles in the composition before the ultrasonication can be acquired with a brightness level of the particle image of 115 and a profile level of the particle image of 169, and subjected to the analysis.

For a solvent or carrier liquid for the measurement, those suitable for the measurement target can be used, but for example, when the particle shape in an oil-based pulverization paste is measured, the measurement is carried out with isopropyl alcohol (IPA).

A sample can be diluted by 1,000 times with a solvent that is used for the measurement, injected into a cell for the particle image measurement (synthetic quartz glass), and subjected to the particle image analysis.

For the photographing of images of particles, images of particles are photographed until the number of particles in the composition before the ultrasonication reaches 10,000. With respect to the planar image of 1,392 pixels×1,040 pixels thus photographed (pixel size: 4.65 μm×4.65 μm), for images of individual particles having a minimum pixel number of 6 pixels or more present in the planar image, the envelope perimeter, the perimeter and the envelope area were measured. The envelope perimeter represents the length of the perimeter of a figure obtained by linking vertexes of convex parts with the shortest distance in a particle image formed by joining pixels with an interval of 4 pixels or less in the vertical, horizontal and diagonal directions; the perimeter represents the length of the profile itself of a particular particle in a particle image formed by joining pixels with an interval of 4 pixels or less in the vertical, horizontal and diagonal directions; and the envelope area represents the projected area of the figure surrounded by the envelope perimeter in a particle image.

That is, when particles of one or more embodiments of the present invention before the ultrasonication are analyzed with a particle shape image analyzer, a preferable measuring method in analyzing the number of particles in which the envelope perimeter of the particle in a planar image is 95% or less of the perimeter and the envelope area of the particle in a planar image is 200 μm$^2$ or less is as follows:

By using a flow cell type, particle shape image analyzer, a planar image with 1,392 pixels×1,040 pixels (pixel size: 4.65 μm×4.65 μm) is photographed with isopropyl alcohol as the measuring solvent by using a 4× objective lens. Then, for "images of individual particles having a minimum pixel number of 6 pixels or more present in the planar image (images formed by joining pixels with an interval of 4 pixels or less in the vertical, horizontal and diagonal directions. Consequently, multiple fine particles and/or fine particulate complexes may be counted as one image)", the envelope perimeter (I), the perimeter (II) and the envelope area (III) are measured.

(I) envelope perimeter: the length of the perimeter of a figure obtained by linking vertexes of convex parts with the shortest distance
(II) perimeter: the length of the profile itself of a particular particle in a particle image formed by joining pixels with an interval of 4 pixels or less in the vertical, horizontal and diagonal directions
(III) envelope area: the projected area of the figure surrounded by the envelope perimeter in a particle image For the planar image analysis with a particle shape analyzer especially in carrying out analysis of "morphological characteristics" of fine particles and/or fine particulate complexes in the composition of one or more embodiments of the present invention before the ultrasonication, it is preferable to carry out the analysis according to, for example, the following method because the exact morphological characteristics of the image of fine particles and/or fine particulate complexes can be acquired.

In analyzing morphological characteristics of fine particles and/or fine particulate complexes in the composition before the ultrasonication, it is preferable to use those having a function of being capable of photographing a general image of an individual particle to analyze its shape, for example, a particle analyzer through dynamic image analysis method (particle shape image analyzer) where fine particles and/or fine particulate complexes are randomly extracted and a large amount of information regarding individual particles can be automatically obtained in a shore period of time by allowing a suspension of particulate objects to flow in a flow cell, automatically determining fine particles and/or fine particulate complexes that come into the photographing visual field, and acquiring and analyzing their morphological characteristics, where a high pixel camera (specifically, an imaging camera that can photograph a planar image on which fine particles and/or fine particulate complexes are present with effective pixels of 1,920 (H)× 1,080 (V) and with pixels more detailed than the pixel size of 2.8 μm×2.8 μm) can be installed in the particle analyzer (for example, PITA-4 from SEISHIN ENTERPRISE Co., Ltd.)

In the composition according to one or more embodiments of the present invention, when 10,000 fine particles and/or fine particulate complexes in the composition before the ultrasonication are analyzed with a particle shape image analyzer, a sufficient light resistance is not exerted if the $10^{th}$ percentile value with respect to a calculated value of "(roughness×circularity)/aspect ratio" is larger than 0.40, and therefore, this value is preferably 0.40 or less, further preferably 0.30 or less, further preferably 0.20 or less, further preferably 0.19 or less, and most preferably 0.14 or less. In addition, 0.01 or more of the $10^{th}$ percentile value with respect to a calculated value of "(roughness×circularity)/aspect ratio" is convenient in view of production and thus preferable, and this value is further preferably 0.02 or more. By adjusting "(roughness×circularity)/aspect ratio" before the ultrasonication within a certain range, the light resistance of the composition according to one or more embodiments of the present invention is enhanced, and furthermore, an effect that deliciousness is also enhanced is obtained. A fine particulate complex with a low calculated value of "(roughness×circularity)/aspect ratio" has, as mentioned later, morphological characteristics such as a shape with large roughness, a shape apart from a perfect circle, and an elongated shape, and has a characteristic shape different from a normal fine particle. The way how a fine particulate complex having such a shape is formed is not certain, but for example, there is possibility that when a food is treated with a high shear force under a pressurized condition and under a rising temperature condition for a short time, re-aggregation of finely pulverized particles occurs and a peculiar shape characteristic defined in one or more embodiments of the present invention is thus obtained. Conventionally, this knowledge that, by carrying out a treatment under such peculiar conditions until the fine particulate complex attains a particular shape property due to re-aggregation, useful effects as shown in one or more embodiments of the present invention can be obtained has not been known at all.

In measuring the roughness, circularity and aspect ratio of the fine particle and/or fine particulate complex in the composition before the ultrasonication, it is necessary to use a camera capable of photographing a detailed image of the fine particle and/or fine particulate complex, and as a camera for photographing images, an imaging camera (CCD camera or C-MOS camera) that can photograph a planar image on which fine particles and/or fine particulate complexes are present with effective pixels of 1,920 (H)×1,080 (V) and with pixels more detailed than the pixel size of approximately 2.8 μm×2.8 μm is preferably used, and for example, DMK33UX290 (from The Imaging Source Co., Ltd.) can be used. As an objective lens for photographing images, the one with a magnification of 4 was used, and images of fine particles and/or fine particulate complexes were photographed while allowing a sample to flow at an appropriate flow rate. In particular, for the shape of the flow cell, by using a planarly extended cell, which can enhance planar extension effects and have the center of most of fine particles and/or fine particulate complexes in the composition before the ultrasonication pass within the focus range that the lens has, the exact morphological characteristics can be acquired. In photographing of images, conditions for the particle image analyzer were set to a degree where the focus is appropriately set, the particle shape can be clearly confirmed, and the contrast with the background is sufficient such that fine particles and/or fine particulate complexes in the composition before the ultrasonication can be clearly distinguished from the background.

For example, as a setting example of analysis conditions after acquisition of images of fine particles and/or fine particulate complexes, when an imaging camera of 8-Bit grayscale (where 0 is black and 255 is white) is used, planar images can be acquired with a LED strength of 100 and a camera gain of 100 db, and then, among them, 10,000 or mote images of individual fine particles or fine particulate complexes can be photographed with a brightness level of the image of fine particles and/or fine particulate complexes of 115 and a profile level of the image of 160, and subjected to the analysis of morphological characteristics. For a solvent or carrier liquid for the measurement, those suitable for the measurement target can be used, but for example, when the particle shape in an oil-based pulverization paste is measured, the measurement is carried out by using isopropyl alcohol (IPA).

A sample can be diluted by 1,000 times with a solvent that is used for the measurement, injected into a cell for the particle image measurement (synthetic quartz glass), and subjected to the image analysis of the shape of fine particles and/or fine particulate complexes.

In photographing images, photographing is carried out until the number of fine particulate complexes reaches 10,000 specimens. With respect to the photographed planar image with 1,920 pixels×1,080 pixels (pixel size: 2.8 μm×2.8 μm), for images of fine particles and/or fine particulate complexes having a minimum pixel number of 15 pixels or more present in the planar image, the roughness, circularity and aspect ratio were measured for each of 10,000 images. Then, for a calculated value of "(roughness× circularity)/aspect ratio" of each fine particle and/or fine particulate complex, the $10^{th}$ percentile value in 10,000 specimens was employed (a percentile value refers to a value obtained by sorting the distribution of measured values from smaller to larger and selecting a value located at an arbitrary percentage. For example, in the case of measuring 10,000 images of fine particles and/or fine particulate complexes, the $10^{th}$ percentile value refers to the calculated value of an image of a fine particle and/or fine particulate complex that is $1000^{th}$ smallest from the bottom.)

The roughness is, in an image of a fine particle or fine particulate complex formed by joining pixels adjacent in the vertical, horizontal and diagonal directions, a value representing the degree of irregularities in the perimeter of the image of a fine particle or fine particulate complex, and is determined by "the length of the perimeter of a figure obtained by linking vertexes of convex parts with the shortest distance in the image of a particular fine particle or fine particulate complex/the length of the profile of the image of a particular fine particle or fine particulate complex." When an image of a fine particle or fine particulate complex has a larger roughness, a smaller value is obtained. The circularity is a value that becomes smaller when the shape of an image of a particular fine particle or fine particulate complex becomes apart from a perfect circle, and is determined by "the perimeter of a perfect circle having the area equal to that of the image of a particular fine particle or fine particulate complex/the length of the profile of the image of a particular fine particle or fine particulate complex." When an image of a fine particle or fine particulate complex has a complicated shape, a smaller value is obtained. The aspect ratio is a value representing the ratio between vertical and horizontal directions of an image of a particular fine particle or fine particulate complex, and is determined by "the longest distance between two points on the profile line of the image of a particular fine particle or fine particulate complex/the distance between two straight lines that are parallel to said longest distance, sandwiching the particle image." When an image of a fine particle or fine particulate complex is elongated, a larger value is obtained. That is, when the number of fine particles of fine particulate complexes having particular morphological characteristics at a strong level, such as a shape with large roughness, a shape apart from a perfect circle and an elongated shape, is larger, "(roughness×circularity)/aspect ratio" is smaller, and when the number of particles having such characteristics notably is larger among 10,000 fine particles and/or fine particulate complexes, the value of the lowest 10% is smaller.

With respect to the above-mentioned measurement conditions of the image analysis of the shape of fine particles and/or fine particulate complexes, if the focus of a photographed image is not adjusted appropriately, it is not possible to exactly measure the shape, and therefore, the measurement is implemented in a state where a photographed image is in focus well.

Note that setting for measurement conditions may shift due to measurement of a sample, and therefore, it is desirable to carry out measurement after readjusting conditions to appropriate ones for every measurement.

That is, in measuring the roughness, circularity and aspect ratio of fine particles, or fine particles and/or fine particulate complexes in the composition of one or more embodiments of the present invention before the ultrasonication, preferable measuring methods are as follows:

By using a flow-cell type, particle shape image analyzer, a planar image with 1,920 pixels×1,080 pixels (pixel size: 2.8 μm×2.8 μm) is photographed with isopropyl alcohol as the measuring solvent, by using a 4× objective lens. Then, for "images of individual fine particles or fine particulate complexes having a minimum pixel number of 15 pixels or more present an the planar image (images formed by joining pixels adjacent in the vertical, horizontal and diagonal directions. Consequently, multiple fine particles and/or fine particulate complexes may be counted as one image)", the roughness (IV), the circularity (V) and the aspect ratio (VI) are measured.

(IV) roughness: the length of the perimeter of a figure obtained by linking vertexes of convex parts with the shortest distance in the image of a particular fine particle or fine particulate complex/the length of the profile of the image of a particular fine particle or fine particulate complex (V) circularity: the perimeter of a perfect circle having the area equal to that of the image of a particular fine particle or fine particulate complex/the length of the profile of the image of a particular fine particle or fine particulate complex (VI) aspect ratio: the longest distance between two points on the profile line of the image of a particular fine particle or fine particulate complex/the distance between two straight lines that are parallel to said longest distance, sandwiching the particle image In the composition according to one or more embodiments of the present invention, among fine particles and/or fine particulate complexes before the ultrasonication, fine particles and/or fine particulate complexes satisfying a particle size of 2.3 µm to 1,600 µm is contained at 10,000 counts/cm$^3$ or more. In a composition before the ultrasonication having a lower content of such fine particles and/or fine particulate complexes compared with the above, effects of one or more embodiments of the present invention are not exerted sufficiently, and such composition is thus not preferable. Said content can be measured by using a measuring method for the planar particle image analysis with a particle shape analyzer (PITA-4) in carrying out analysis of "morphological characteristics" of fine particles and/or fine particulate complexes in the composition before the ultrasonication.

The composition of one or more embodiments of the present invention contains fine particles and/or fine particulate complexes before the ultrasonication, and after the ultrasonication, a part or all of the complexes collapse, and therefore, not only the maximum particle size, but also the specific surface area per unit volume, modal diameter, d50 and the like after the ultrasonication vary greatly compared with those before the treatment.

With respect to the specific surface area per unit volume, when the specific surface area per unit volume before the ultrasonication is larger than 1.00 m$^2$/mL, it is believed that finely pulverized products are not re-aggregated sufficiently, and therefore, it is preferably 1.00 m$^2$/mL or less and preferably 0.80 m$^2$/mL or less. In addition, when the specific surface area per unit volume after the ultrasonication is less than 0.10 m$^2$/mL, the re-aggregation strength of the complex is not sufficient, and therefore, it is preferably 0.10 m$^2$/mL or more, more preferably 0.15 m$^2$/mL or more, more preferably 0.20 m$^2$/mL or more, and most preferably 0.25 m$^2$/mL or more. Furthermore, for the re-aggregation strength of the complex, it is preferable that the ultrasonication increase the specific surface area per unit volume by 1.6 times or more, more preferably 1.9 times or more, and further preferably 2.2 times or more.

The modal diameter before the ultrasonication is preferably 20 µm or more, more preferably 25 µm or more, further preferably 30 µm or more, and most preferably 40 µm or more. In addition, it is preferably 400 µm or less, more preferably 300 µm or less, further preferably 220 µm or less, and most preferably 150 µm or less.

Moreover, the modal diameter after the ultrasonication is preferably 0.3 µm or more, more preferably 1 µm or more, further preferably 3.0 µm or more, particularly preferably 5.0 µm or more, and most preferably 7.0 µm or more. Furthermore, the modal diameter after the ultrasonication is preferably 200 µm or less, more preferably 150 µm or less, further preferably 100 µm or less, particularly preferably 90 µm or less, and most preferably 50.0 µm or less.

In particular, by adjusting the modal diameter after the ultrasonication within a certain range, a texture specific to the composition according to one or more embodiments of the present invention, as if it breaks softly in the mouth, can be felt more preferably. In addition, it is preferable that the ultrasonication change the modal diameter to 1% or more and 90% or less, and more preferably to 2% or more and 80% or less. By adjusting the rate of change in the modal diameter around the ultrasonication within a certain range, a texture specific to the composition according to one or more embodiments of the present invention, as if it breaks softly in the mouth, can be felt further preferably. For example, when the modal diameter of the composition before the ultrasonication is 100 µm and the modal diameter of the composition after the ultrasonication is 20 µm, the rate of change in the modal diameter around the ultrasonication is 20%.

The d50 before the ultrasonication is preferably 20 µm or more, more preferably 25 µm or more, and further preferably 30 µm or more. In addition, the d50 before the ultrasonication is preferably 400 µm or less, more preferably 300 µm or less, and further preferably 250 µm or less. The d50 after the ultrasonication is preferably 1 µm or more, more preferably 5 µm or more, and further preferably 8 µm or more. Moreover, the d50 after the ultrasonication is preferably 150 µm or less, more preferably 100 µm or less, and further preferably 75 µm or less. Furthermore, by adjusting both the d50 and/or the modal diameter after the ultrasonication, and the 10$^{th}$ percentile value of "(roughness×circularity)/aspect ratio" in fine particles and/or fine particulate complexes in the composition before the ultrasonication within a preferable range, an effect that the light resistance is synergistically enhanced is obtained, which is particularly preferable. In addition, by adjusting the number of particles with a particular shape ((A) the envelope perimeter of a particle in a planar image is 95% or less of the perimeter; and (B) the envelope area of a particle in a planar image is 200 µm$^2$ or less) within a preferable range such that the number of particles satisfying both (A) and (B) is at a certain proportion or more, an effect that the light resistance is synergistically enhanced is obtained, which is particularly preferable.

The particle size in one or more embodiments of the present invention all represents a particle size measured based on volume, unless otherwise indicated. In addition, the "particle" in one or more embodiments of the present invention is a concept that can encompass a fine particle and/or fine particulate complex, unless otherwise indicated.

Moreover, the specific surface area per unit volume in one or more embodiments of the present invention represents a specific surface area per unit volume (1 mL) in the case where the particle is assumed to be spherical, and it is obtained by measuring a sample with a laser diffraction type particle size distribution measuring apparatus. Note that the specific surface area per unit volume in the case where the particle is assumed to be spherical is a numerical value based on a measurement mechanism different from a measured value reflecting the component or surface structure of the particle, which is unmeasurable with a laser diffraction type particle size distribution measuring apparatus (the specific surface area per volume or per weight determined by permeability method or gas adsorption method). Furthermore, the specific surface area per unit volume in the case where the particle is assumed to be spherical is determined by "6×Σ (ai)/Σ (ai·di)," where the surface area per particle is ai and the particle size is di.

The modal diameter represents, with respect to the particle size distribution for each channel obtained by measuring the composition with a laser diffraction type particle size distribution measuring apparatus, the particle size of a channel whose % particle frequency is the highest. When multiple channels having exactly the same % particle frequency are present, the particle size of a channel whose particle size is the smallest among them is employed. If the particle size distribution is a normal distribution, its value coincides with the median diameter, but when the particle size distribution has a deviation, especially when the particle size distribution has multiple peaks, their numerical values vary greatly. Particle size distribution measurement of the sample with a laser diffraction type particle size distribution measuring apparatus can be implemented according to, for example, the following method. Note that, when the sample is a thermoplastic solid, the sample can be subjected to the analysis via a laser diffraction type particle size distribution measuring apparatus by heat treating the sample to alter it to liquid and then subjecting it to the analysis.

For the laser diffraction type particle size distribution measuring apparatus, for example, Microtrac MT3300 EX II system from MicrotracBEL Corp. can be used. With respect to a solvent for the measurement, those unlikely to affect the structure of fine food particles in the composition can be used. For example, it is preferable to use 95% ethanol (for example, a particular alcohol commercially available from Japan Alcohol Corporation, Traceable 95 First Grade with an alcohol content of 95) as the measuring solvent for a composition with a lot of oil. In addition, as a measurement application software, DMS2 (Data Management System version 2, from MicrotracBEL Corp.) can be used. In the measurement, the cleaning button of the measurement application software is pressed down to implement cleaning, the Setzero button of the software is then pressed down to implement zero adjustment, and a sample can be directly introduced until entering a proper concentration range with sample loading. For a sample not to be subjected to the ultrasonication, the concentration is adjusted to a proper range in two times of sample loading after introducing the sample, and immediately after the adjustment, laser diffraction is carried out at a flow rate of 60% and for a measuring time of 10 seconds, and the obtained result is used as a measured value. For a sample to be subjected to the ultrasonication, the concentration is adjusted to a proper range with sample loading after introducing the sample, and after the adjustment, by pressing down the ultrasonication button of the software, the ultrasonication is carried out with a frequency of 40 kHz and an output of 40 W for 3 minutes. After a degassing treatment is carried out three times, the sample loading treatment is carried out again after the ultrasonication. After it is confirmed that the concentration is in a proper range, laser diffraction is promptly carried out at a flow rate of 60% and for a measuring time of 10 seconds, and the obtained result can be used as a measured value.

For measurement conditions, the measurement can be carried out under conditions of distribution display: volume, refractive index of particle: 1.60, refractive index of solvent: 1.36, measuring upper limit (μm)=2,000.00 μm, and measuring lower limit (μm)=0.021 μm.

In one or more embodiments the present invention, when the particle size distribution for each channel (CH) is measured, it can be measured by using a particle size for each measurement channel described in Table 1, which will be mentioned later, as the standard. The particle size defined for each channel is also referred to as "the particle size of channel XX." The % particle frequency for each channel (which is also referred to as "the % particle frequency of channel XX") can be determined by measuring, for each channel, the frequency of particles whose particle size is not more than the particle size defined for each channel and larger than the particle size defined for the next channel (for the largest channel within the measuring range, a particle size at the measuring lower limit), and using the total frequency of all channels within the measuring range as a denominator. For example, the % particle frequency of channel 1 represents the % frequency of particles with a particle size of 2,000.00 μm or less and larger than 1826.00 μm.

That is, a preferable measuring method in measuring the composition containing fine food particulate complexes of one or more embodiments of the present invention with a laser diffraction type particle size distribution measuring apparatus is as follows. With a laser diffraction type particle size distribution measuring apparatus, quickly after introducing a sample, the particle size is measured by using 95% ethanol as a measuring solvent and targeting the measuring upper limit of 2,000.00 μm and the measuring lower limit of 0.021 μm. For a sample to be subjected to ultrasonication, ultrasonication with a frequency of 40 kHz and an output of 40 W for 3 minutes is carried out.

The composition of one or more embodiments of the present invention may contain an oil/fat. For the type of the oil/fat, mention may be made of edible oils/fats, various fatty acids, foods obtained by using them as a raw material, and the like, but it is preferable to use an edible oil/fat. In addition, it is preferable that the total oil/fat content of the entire composition be 30% by mass or more because the light resistance is enhanced, and the total oil/fat content is further preferably 34% by mass or more, further preferably 40% by mass or more, and most preferably 50% by mass or more. Moreover, since it becomes hard to grasp the taste of the material, the total oil/fat content is preferably 90% by mass or less, further preferably 85% by mass or less, and most preferably 80% by mass or less.

Examples of the edible oil/fat includes sesame oil, rapeseed oil, high oleic acid rapeseed oil, soybean oil, palm oil, palm stearin, palm olein, palm kernel oil, palm mid fraction (PMF), cottonseed oil, corn oil, sunflower oil, high oleic acid sunflower oil, safflower oil, olive oil, linseed oil, rice oil, camellia oil, perilla oil, flavor oil, coconut oil, grape seed oil, peanut oil, almond oil, avocado oil, salad oil, canola oil, fish oil, beef tallow, lard, chicken fat, or MCT (medium-chain triglyceride), diglyceride, hydrogenated oil, interesterified fat, milk fat, ghee, cacao butter, and the like, but it is preferable to use oils/fats other than cocoa butter because they are convenient for the production. In addition, liquid edible oils/fats such as sesame oil, olive oil, rapeseed oil, soybean oil, milk fat, sunflower oil, rice oil and palm olein are more preferable because they have effects of enhancing the smoothness of a food composition and can be used mote effectively. The liquid edible oil/fat in one or more embodiments of the present invention represents an oil/fat having "a liquid-like flowability (specifically, when measured with a Bostwick viscometer (in one or more embodiments of the present invention, the one with the length of a trough of 28.0 cm and a Bostwick viscosity, that is, the maximum distance of a sample flowing down in the trough of 28.0 cm is used), a Bostwick viscosity (a measured value of the distance of the sample flowing down in the trough at a certain temperature for a certain period of time) at 20° C. for 10 seconds is 10 cm or more, more preferably 15 cm or more, and further preferably 28 cm or more) at ordinary temperature (which represents 20° C. in one or more embodiments of the present invention)." Moreover, in one or more embodiments of the present invention, it is preferable that an oil/fat part in the composition (for example, an oil/fat component separated upon centrifugation carried out at 15,000 rpm for 1 minute) have a liquid-like flowability (specifically, when measured with a Bostwick viscometer, a Bostwick viscosity at 20° C. for 10 seconds is 10 cm or more, more preferably 15 cm or more, and further preferably 28 cm or more). Furthermore, when two or more oils/fats including a liquid oil/fat are used, it is preferable that the liquid oil/fat account for 90% by mass or more of the entire oil/fat, it is further preferable that the liquid oil/fat account for 92% by mass or more, it is further preferable that the liquid oil/fat account for 95% by mass or more, and it is most preferable that the liquid oil/fat account for 100% by mass. In addition, the edible oil/fat may be an oil/fat included in the food material of the composition, but it is preferable that an oil/fat that has been subjected to an extraction and purification treatment be added separately from the food material because the compatibility between the oil/fat and the food material is better. It is preferable to add an oil/fat that has been subjected to an extraction and purification treatment at 10% by mass or more of the entire oil/fat, and more preferably, it is preferable to add an oil/fat that has been subjected to an extraction and purification treatment at 30% by mass or more.

Moreover, it is preferable that the edible oil/fat be an edible oil/fat in which the proportion of an unsaturated fatty acid (the total proportion of a monounsaturated fatty acid and a polyunsaturated fatty acid) is higher than the proportion of a saturated fatty acid in the composition thereof because the fine pulverization processing can be carried out efficiently, and it is further preferable that the proportion of an unsaturated fatty acid be higher than the doubled amount of the proportion of a saturated fatty acid.

Furthermore, examples of foods obtained by using an edible oil/fat as a raw material include butter, margarine, shortening, fresh cream, soy milk cream (for example, "Ko-cream" (R) from FUJI OIL CO., LTD.), and the like, but especially, foods having physical properties of liquid can be conveniently used. Among these, two or more edible oils/fats, or foods obtained by using them as a raw material may be used in combination at an arbitrary ratio.

For the content of the fine food particles in the composition according to one or more embodiments of the present invention, the content of fine food particles in the composition is measured, excluding foods and the like having a particle diameter larger than 2,000 μm (2 mm), which is out of the target for measurement with a laser diffraction type particle size distribution measuring apparatus or a particle shape image analyzer in one or more embodiments of the present invention. When the composition contains foods and the like larger than 2 mm, the content of fine food particles refers to, for example, the weight, of a precipitated fraction obtained by passing the composition through 9 mesh (2 mm opening), subjecting the resultant fraction to centrifugation, and sufficiently removing the separated supernatant (in the case of a solid oil/fat, it is heated and melted, and after removing foods and the like larger than 2 mm as necessary, centrifugation is implemented to remove the separated supernatant). A part of the oil/fat and water is incorporated in the precipitated fraction, and therefore, the total amount of fine food particles represents the total weight of those components incorporated in the precipitated fraction and the food. The content of fine food particles in the composition is only required to be 20% by mass or more and 98% by mass or less, but if it is less than 20% by mass, it is not possible to feel the taste of the material sufficiently, and such content is thus not preferable. In addition, when the content of fine food particles exceeds 98% by mass, the quality of the composition becomes unsuitable for ingestion, and such content is thus not preferable. Moreover, the content of fine food particles is preferably 20% by mass or more, preferably 30% by mass or more, more preferably 45% by mass or more, and most preferably 65% by mass or more. Furthermore, the content of fine food particles is preferably 98% by mass or less, further preferably 90% by mass or less, further preferably 85% by mass or less, and most preferably 80% by mass or less.

For the content of fine food particles in one or more embodiments of the present invention, the content of fine food particles in the composition can be measured by, for example, passing an arbitrary amount of the composition through 9 mesh (tyler mesh), subjecting the flow through fraction to centrifugation at 15,000 rpm and for 1 minute, sufficiently removing the separated supernatant, and measuring the weight of the precipitated fraction. For the residue on the mesh after passing the composition through 9 mesh, after leaving it at rest sufficiently, fine food particles smaller than the opening of 9 mesh are allowed to sufficiently pass the mesh with a spatula or the like without altering the particle size of the composition, and then, the flow through fraction is obtained. For a composition having a low flowability to a degree where the composition does not pass 9 mesh (for example, physical properties including a Bostwick viscosity of 10 cm or less at 20° C. for 30 seconds), the content of fine food particles in the composition can be measured by diluting the composition with a solvent such as olive oil by approximately 3 times, allowing it to pass through 9 mesh, and then subjecting it to centrifugation. In addition, for a thermoplastic composition, the content of fine food particles in the composition can be measured by heating the composition to impart flowability, diluting it with a solvent such as olive oil by approximately 3 times, allowing it to pass through 9 mesh, and then subjecting it to centrifugation.

The pulverizing processing or fine pulverization means used for one or more embodiments of the present invention is not particularly limited, and may be a means that can treat a food with a high shear force under a pressurized condition and under a rising temperature condition for a short period of time. It may be any equipment that is referred to as a blender, mixer, milling machine, kneading machine, pulverizing machine, disintegrating machine, grinding machine or the like, may be any of dry pulverization and wet pulverization, and may be any of high temperature pulverization, ordinary temperature pulverization and low temperature pulverization. For example, as a dry fine pulverizing machine, medium stirring mills such as dry bead mills and ball mills (including tumbling type and vibration type), jet mills, high speed rotation impact type mills (including pin mills), roller mills, hammer mills and the like can be used. For example, for wet fine pulverization, medium stirring mills such as bead mills and ball mills (including tumbling type, vibration type and planetary type mills), roller mills, colloid mills, Star Burst, high-pressure homogenizers and the like can be used. For a composition containing fine food particles having a particular shape in a state of having been subjected to a wet fine pulverizing processing, medium stirring mills (ball mills and bead mills) and high-pressure homogenizers can be used more preferably. For example, high-pressure homogenizers and medium stirring mills can be used preferably.

Specifically, a composition containing fine food particles having properties of one or more embodiments of the present invention can be obtained preferably by crushing a sample through a one-pass treatment (normally, treatment time is less than 30 minutes) in a bead mill pulverizing machine by using beads having a particle size of 2 mm or less, under a pressurized condition with a maximum pressure obtained by adding 0.01 MPa or more to ordinary pressure (preferably pressurized to 0.01 MPa or more and 1 MPa or less, and further preferably pressurized to 0.02 MPa or more and 0.50 MPa or less) and under a rising temperature condition within the range where, compared with a sample temperature immediately after initiation of the treatment (treatment temperature: T1), a sample temperature upon termination of the treatment (treatment temperature: T2) satisfies "T1+1<T2<T1+50" (more preferable when adjusted to T2≥25). When a bead mill using beads having a particle size larger than 2 mm (for example, a medium stirring mill referred to as a "ball mill" such as an attritor normally using beads of 3 to 10 mm) is used, a treatment for a long period of time is required to obtain fine food particles having a particular shape defined in one or more embodiments of the present invention and it is also hard to raise the pressure above ordinary pressure in principle, and therefore, it is hard to obtain the composition according to one or more embodiments of the present invention. In addition, a method of generating a condition in which the pressure is raised above ordinary pressure upon the fine pulverization processing may be any method, but especially, in order to obtain the pressurized condition in a bead mill pulverizing machine preferably, a method of carrying out the treatment by installing a filter with an appropriate size at a treatment outlet to adjust the pressurized condition while adjusting the liquid transferring speed of the contents is preferable. The fine pulverization processing is preferably carried out in a state where the pressure is raised and adjusted to the maximum of 0.01 MPa or more during the treatment time, and the pressure is further preferably adjusted to 0.02 MPa or more. When the treatment is carried out by using a medium stirring mill, it is preferable that the Bostwick viscosity of the contents before the treatment (measurement temperature: 20° C.) be 28.0 cm or less in one second because the pressure is readily adjusted. Note that, when the pressurized condition is too harsh, there is a risk that the facility is damaged, and therefore, when the treatment is carried out by using a medium stirring mill, the upper limit of the pressurized condition during the fine pulverization processing is preferably 1.0 MPa or less and further preferably 0.50 MPa or less.

When the fine pulverization processing is carried out by using a high-pressure homogenizer, the processing under the pressurized condition can be preferably carried out. Furthermore, the processing can be further preferably carried out by carrying out with a medium stirring mill before the processing with a high-pressure homogenizer, or by carrying out with a medium stirring mill after the processing with a high-pressure homogenizer. For the high-pressure homogenizer, anything can be used as long as it can be used as a homogenizer under a condition in which the pressure is raised above ordinary pressure, but for example, the Panda 2K homogenizer (from Niro Soavi) can be used. With respect to the conditions, the fine pulverization processing can be carried out by, for example, implementing a high pressure homogenization processing under 100 MPa for a single time or for multiple times.

In particular, when a pulverizing method using a wet bead mill is employed, compared with other processing methods, separation of the oil/fat upon leaving the food composition at rest is not likely to occur and a quality with a high stability is achieved, which is preferable. The principle behind this is not clear, but it is believed that the bead mill processing preferably alters the particle state of fine food particles. In addition, with respect to conditions upon the processing with a wet bead mill, the size and filling rate of beads, the mesh size of the outlet, the liquid transferring speed of the raw material slurry, the rotational strength of the mill, whether the processing is carried out with a scheme in which the sample is allowed to pass only once (one-pass) or with a scheme in which the sample is allowed to circulate many times (circulating type), and the like may be selected and adjusted appropriately depending on the size or nature of the food material, and the targeted nature of the composition containing fine food particles, but a one-pass processing is preferable, and the processing time is further preferably 1 minute or more and 25 minutes or less, and most preferably 2 minutes or more and 20 minutes or less. The processing time in one or more embodiments of the present invention represents a time during which the sample to be processed is subjected to a shearing processing. For example, in a bead mill crushing machine with the volume of a pulverization chamber of 100 mL and the percentage of voids excluding beads, to which the processing liquid can be injected, of 50%, when a one-pass processing is carried out at a rate of 200 mL/minute without circulating the sample, since the empty clearance in the pulverization chamber is 50 mL, the processing time for the sample is 50/200=0.25 minute (15 seconds). Moreover, it is better to subject to the fine pulverization processing a food material that has been roughly pulverized in advance with a jet mill, a pin mill, a stone mill pulverizing mill or the like as a pretreatment beforehand, and although the principle is not clear, when a food material powder with the size adjusted to a median diameter of 1,000 μm or less and 100 μm or more is subjected to the fine pulverization processing, adhesion property to a target is further enhanced, which is more preferable. Furthermore, in the bead mill processing, the material of beads and the material of the internal cylinder of the bead mill are preferably the same material, and it is further preferable that both materials be zirconia.

The composition of one or more embodiments of the present invention may contain water. Water may be added as liquid water, or may be included in the composition as water originating from raw materials. In addition, when the water content of the entire composition is larger than 20% by mass, it is hard to adjust the shape of the complex defined in one or more embodiments of the present invention, and therefore, the water content of the entire composition is preferably 20% by mass or less, further preferably 15% by mass or less, further preferably 10% by mass or less, and most preferably 5% by mass or less.

Moreover, in producing the composition according to one or more embodiments of the present invention, especially when the medium contains water, by subjecting the food to a processing with a medium stirring mill, in particular to a processing with a wet bead mill, in a state where the water content of the food is lower than the water content of the medium, fine food particles with a particular shape tend to be formed, which is useful. Specifically, it is preferable to subject a dried food to a processing with a medium stirring mill, in particular to a processing with a wet bead mill, by using an oil/fat or water as the medium. Furthermore, when water in the medium is 25% by mass or more, the processing efficiency with a medium stirring mill deteriorates, and therefore, the water content is preferably less than 25% by mass. In addition, it is better to adjust to 20 Pa·s or less the viscosity (measurement temperature: 20° C.) of a food-containing medium before the fine pulverization processing in which the food is contained in an oil/fat or water, and when it is adjusted to 8 Pa·s, the efficiency of fine pulverization processing is further enhanced, which is useful. Moreover, it is preferable that the viscosity (measurement temperature: 20° C.) of the composition containing fine food particles be adjusted to 100 mPa·s or more, and it is more preferable that the viscosity be adjusted to 500 mPa·s or more.

The composition of one or more embodiments of the present invention can be, not only eaten as it is, but also preferably used as a raw material or a material of a food/drink product or a liquid seasoning. That is, one or more embodiments of the present invention encompasses a food/drink product and a liquid seasoning containing the composition containing fine food particles according to one or more embodiments of the present invention. Use of the composition of one or more embodiments of the present invention as a part of raw materials enables to produce seasonings having a high dispersion stability such as sauce, dipping sauce, dip, mayonnaise, dressing, butter and jam. Desirably, the amount to be added to the seasoning is approximately around 0.001 to 50% by mass. In addition, in the production, the composition may be added to the seasoning at any time. Specifically, the composition may be added to the seasoning, or raw materials of the composition (food materials) may be added to raw materials of the seasoning and the fine pulverization processing may then be implemented, or these methods may be combined, but the method in which the composition is added to the seasoning is industrially convenient and preferable.

Besides foods forming fine particulate complexes, the composition of one or more embodiments of the present invention may contain various foods, food additives or the like that are used for general foods, as necessary, in the range satisfying constituent elements according to one or more embodiments of the present invention. For example, mention may be made of soy sauce, miso (fermented soybean paste), alcohols, saccharides (such as glucose, sucrose, fructose, glucose-fructose syrup and fructose-glucose syrup), sugar alcohols (such as xylitol, erythritol and maltitol), artificial sweeteners (such as sucralose, aspartame, saccharin and acesulfame K), minerals (such as calcium, potassium, sodium, iron, zinc and magnesium, as well as salts thereof), flavoring agents, pH modifiers (such as sodium hydroxide, potassium hydroxide, lactic acid, citric acid, tartaric acid, malic acid and acetic acid), cyclodextrin, antioxidants (such as vitamin E, vitamin C, tea extract, raw coffee bean extract, chlorogenic acid, spice extract, caffeic acid, rosemary extract, vitamin C palmitate, ruitn, quercetin, myrica extract and sesame extract), and the like. In addition, emulsifying agents (such as glycerine fatty acid ester, acetic acid monoglyceride, lactic acid monoglyceride, citric acid monoglyceride, diacetyltartaric acid monoglyceride, succinic acid monoglyceride, polyglycerine fatty acid ester, polyglycerin condensed ricinoleic acid ester, Quillaja extract, soybean saponin, tea seed saponin and sucrose fatty acid ester), coloring agents and thickening stabilizers can also be added, but due to a recent rise of nature-oriented trend, the quality is desirable in which an emulsifying agent as a so-called food additive, and/or a coloring agent as a food additive and/or a thickening stabilizer as a food additive (for example, those listed as a "coloring agent", "thickening stabilizer" and "emulsifying agent" in "Name List of Food Additive Substances for Designation" of Pocketbook of Food Additive Designation (version H23)) are not added, and in particular, when an emulsifying agent as a food additive is not added, the quality in which the taste of the material is likely to be felt is obtained, which is preferable. Furthermore, the most desirable is the quality not containing food additives (for example, substances listed in "Name List of Food Additive Substances for Designation" of Pocketbook of Food Additive Designation (version H23) that are used for the food additive purpose).

Moreover, it is preferable not to use saccharides (such as glucose, sucrose, fructose, glucose-fructose syrup and fructose-glucose syrup) because they tend to prevent sweetness of the food itself from being felt.

That is, one or more embodiments of the present invention include the following aspects:

[1] an aspect in which no food additive formulation is contained; and

[2] an aspect in which no emulsifying agent as a food additive formulation is contained.

Although the principle is not clear, the composition of one or more embodiments of the present invention exhibits properties in which the stability of the composition (color stability during storage and light resistance) is improved by carrying out the fine pulverization processing until the total number of fine particles or fine particulate complexes having a particular particle shape is increased to a certain proportion or more. In commercially distributing the composition, multiple burdens such as light or heat are applied, and therefore, by improving either or both of the color stability during storage and the light resistance, the stability of the composition is improved notably. This trend is notably recognized especially when the fine pulverization processing is carried out with a medium stirring mill and/or a high-pressure homogenizer. Accordingly, one or more embodiments of the present invention include the following inventions as derived aspects focusing on effects of improving stability through the fine pulverization processing in the method for producing the composition according to one or more embodiments of the present invention.

(1) A method for producing a composition containing fine food particles, characterized in that a food is subjected to a fine pulverization processing with a medium stirring mill and/or a high-pressure homogenizer until the number of fine particles satisfying both (A) and (B) described below, which is obtained upon analysis through particle shape image analysis, after the processing increases by 1.1 times or more compared with that before the processing:

(condition A) an envelope perimeter of a particular particle in a planar image is 95% or less of a perimeter; and (condition B) an envelope area of a particular particle in a planar image is 200 $\mu m^2$ or less.

(2) A composition containing fine food particles, characterized in that the fine food particle is in a state of having been subjected to a fine pulverization processing with a medium stirring mill and/or a high-pressure homogenizer until the number of fine particles satisfying both (A) and (B) described below, which is obtained upon analysis through particle shape image analysis, after the processing increases by 1.1 times or more compared with that before the processing:

(condition A) an envelope perimeter of a particular particle in a planar image is 95% or less of a perimeter; and (condition B) an envelope area of a particular particle in a planar image is 200 $\mu m^2$ or less.

(3) A method for producing a fine food particulate complex, where a food is subjected to a wet pulverizing processing with a medium stirring mill and/or a high-pressure homogenizer, and a fine food particulate complex having the following characteristics is produced:

(a) a maximum particle size before ultrasonication is larger than 100 $\mu m$; (b) a maximum particle size after the ultrasonication decreases by 10% or more compared with chat before the processing; (c) a modal diameter after the ultrasonication is 0.3 $\mu m$ or more and 200 $\mu m$ or less; and (d) when 10,000 fine particles and/or fine particulate complexes in the composition before the ultrasonication are subjected to analysis with a particle shape image analyzer, a $10^{th}$ percentile value of a numerical value N for each fine particle and/or fine particulate complex, which is determined in accordance with a calculation formula described below, is 0.40 or less:

$$N=(\text{roughness}\times\text{circularity})/\text{aspect ratio}.$$

(4) A method for improving a light resistance of a composition containing a particulate complex through a pulverizing processing of a food, where the composition containing fine food particulate complexes is characterized in that (a) a maximum particle size before ultrasonication is larger than 100 μm; (b) when the ultrasonication is carried out, a modal diameter after the processing is 0.3 μm or more and 200 μm or less; and (c) when 10,000 fine particles and/or fine particulate complexes in the composition before the ultrasonication are subjected to analysis with a particle shape image analyzer, a $10^{th}$ percentile value of a numerical value N for each fine particle, fine particulate complex, which is determined in accordance with a calculation formula described below, is 0.40 or less:

$$N=(\text{roughness}\times\text{circularity})/\text{aspect ratio}.$$

(5) A method for improving a color stability during storage of a composition containing a particulate complex through a pulverizing processing of a food, where the composition containing fine food particulate complexes is characterized in that (a) a maximum particle size before ultrasonication is larger than 100 μm; (b) when the ultrasonication is carried out, a modal diameter after the processing is 0.3 μm or more and 200 μm or less; and (c) the number of particles satisfying (A) and (B) described below is 1% or more when the composition before the ultrasonication is subjected to analysis with a particle shape image analyzer:

(A) an envelope perimeter of a particle in a planar image is 95% or less of a perimeter; and (B) an envelope area of a particle in a planar image is 200 $\mu m^2$ or less.

Although the principle is not clear, the composition of one or more embodiments of the present invention exhibits properties in which the stability of the composition (color stability during storage and light resistance) is enhanced by carrying out the fine pulverization processing until the percentage by which the maximum particle size of the composition after the ultrasonication decreases compared with that before the processing (the decreasing rate of the maximum particle size) becomes a certain level or less. In commercially distributing the composition, multiple burdens such as light or heat are applied, and therefore, by improving either or both of the color stability during storage and the light resistance, the stability of the composition is improved notably. This trend is notably recognized especially when the fine pulverization processing is carried out with a medium stirring mill and/or a high-pressure homogenizer. Due to this unknown attribute, one or more embodiments of the present invention include the following inventions as derived aspects focusing on effects of improving stability through the fine pulverization processing in the method for producing the composition according to one or more embodiments of the present invention.

(6) A method for producing a composition containing fine food particles, characterized in that a food is subjected to a fine pulverization processing with a medium stirring mill and/or a high-pressure homogenizes until a decreasing rate of a maximum particle size of the composition through ultrasonication with a frequency of 40 kHz and an output of 40 W for 3 minutes becomes 10% or more.

(7) A composition containing fine food particles, characterized in that the fine food particle is a food in a state of having been subjected to a fine pulverization processing with a medium stirring mill and/or a high-pressure homogenizer until a decreasing rate of a maximum particle size of the composition through ultrasonication with a frequency of 40 kHz and an output of 40 W for 3 minutes becomes 10% or more.

EXAMPLES

Hereinafter, one or more embodiments of the present invention will be described in further detail in accordance with Examples, but these Examples are merely examples conveniently illustrated for description, and one or more embodiments of the present invention is in no sense limited to these Examples,

[Method for Preparing Sample of Composition Containing Fine Food Particles]

Compositions containing line food particles were prepared as follows.

Each of dried products of sweet corn and rice, which belong to grains, and carrot, pumpkin and tomato, which belong to vegetables, was pulverized according to the method described in "Pretreatment" in Tables to obtain dried pulverized products. Furthermore, dried beans of soybean, which belongs to legumes, and a dried product of green soybean (soybean in an immature state harvested with a pod, and the bean exhibits a green appearance) obtained by boiling, taking out from the pod and drying it were pulverized according to the method described in "Pretreatment" in Tables to obtain dried pulverized products. Furthermore, each of roasted dried products of chickpea, which belongs to peas, and macadamia nut, sesame and pistachio, which belong to seeds, was pulverized according to the method described in "Pretreatment" in Tables to obtain dried pulverized products. Furthermore, undried and dried products of avocado, which belongs to fruits, were pulverized according to the method described in "Pretreatment" in Tables to obtain a raw pulverized product and a dried pulverized product, respectively. All dried pulverized products were subjected to the drying processing at least until the water activity became 0.95 or less. In addition, a dried product of chicken meat (chicken), which belongs to animals, was pulverized with common salt according to the method described in "Pretreatment" in Tables to obtain a pulverized, dried pulverized product.

Compositions obtained by mixing these pulverized products appropriately according to the formulation in Tables were stirred well with a tabletop stirrer until they appear generally uniform to obtain pasty compositions. As an oil/fat, a commercially available rapeseed oil (7% of saturated fatty acids, 86% of unsaturated fatty acids), an olive oil (14% of saturated fatty acids, 80% of unsaturated fatty acids) and a commercially available cocoa butter (60% of saturated fatty acids and 33% of unsaturated fatty acids) were used.

With respect to a method of fine pulverization processing, a pulverizing processing was implemented appropriately according to the method described in "Method of fine pulverization processing" in Tables. When "beads" were used as a medium, a wet bead mill fine pulverizing machine was used, and with beads of ϕ2 mm, the fine pulverization processing was performed under processing conditions in Tables to obtain a composition containing a finely pulverized food. With respect to a pressurized condition, the maximum pressure during the processing (when the processing is carried out under ordinary pressure, there is no pressurization and thus, it is 0) was adjusted to the pressurized condition described in Tables by adjusting the opening at the outlet of the wet bead mill fine pulverizing machine to 0.6 mm and altering the liquid transferring speed appropriately. The fine pulverization processing was carried out under constant conditions until termination of the processing.

When "balls" were used as a medium, an attritor was used, and with balls of ϕ4 mm, the fine pulverization processing was performed under processing conditions in Tables to obtain a composition containing a finely pulverized food.

For Text Example 38, a tempering processing was implemented after the fine pulverization processing. Specifically, the composition after the fine pulverization processing was heated to 45 to 50° C., and after reaching the target temperature, water-cooled to 27 to 28° C. while mixing slowly. Furthermore, after reaching the target temperature, a heating processing was carried out with hot water bath to 31 to 33° C.

Note that, for each food material, parts excluding inedible parts were used unless otherwise indicated.

(1) Analysis of the Number of Particles with Particular Shape (Envelope Perimeter, Perimeter and Envelope Area)

In carrying out analysis of the number of particles with a particular shape in the composition according to one or more embodiments of the present invention, in the case of measuring complexes having a particular particle shape and physical properties, planar image analysis with a particle shape analyzer was carried out according to the following method.

As the particle shape image analyzer for carrying out the analysis of the number of particles, PITA-3 from SEISHIN ENTERPRISE Co., Ltd. was used, which can photograph a general image of an individual particle to analyze its particle shape, and which can automatically determine and analyze particles that come into the photographing visual field by allowing a suspension of particulate objects to flow in a flow cell.

For a camera for photographing an image of particles, CM-140MCL (from Japan Analytical Industry Co., Ltd.) was used as an imaging camera that can acquire a planar image on which particles are present with effective pixels of 1,392 (H)×1,040 (V) and with pixels coarser than the pixel size of approximately 4.65×4.65 μm. As an objective lens for photographing images of particles, the one with a magnification of 4 was used, and images of particles were photographed while allowing a sample to flow at an appropriate flow rate. For the flow cell, a planarly extended cell was used. In photographing of images of particles, conditions for the particle image analyzer were set to a degree where the focus is appropriately set, the particle shape can be clearly confirmed, and the contrast with the background is sufficient such that particles can be clearly distinguished from the background. Specifically, an imaging camera of 8-Bit grayscale (where 0 is black and 255 is white) was used, and planar images on which particles are present were acquired with a LED strength of 110 and a camera gain of 100 db, and then, among them, images of individual fine particles and/or fine particulate complexes in the composition before the ultrasonication were acquired with a brightness level of the particle image of 115 and a profile level of the particle image of 169, and subjected to the analysis.

With respect to a solvent or carrier liquid for the measurement, the measurement was carried out with isopropyl alcohol (IPA). A sample was diluted by 1,000 times with a solvent that is used for the measurement, injected into a cell for the particle image measurement (synthetic quartz glass), and subjected to the particle image analysis.

For the photographing of images of particles, images of particles were photographed until the number of particles of fine particles and/or fine particulate complexes in the composition before the ultrasonication reached 10,000. With respect to the photographed particle image of 1,392 pixels× 1,040 pixels (pixel size: 4.65 μm×4.65 μm), analytical processing was carried out for images of individual particles having a minimum pixel number of 6 pixels or more in the planar image, and the envelope perimeter, the perimeter and the envelope area of each particle were measured and the number of particles satisfying both "the envelope perimeter of the particle in the planar image being 95% or less of the perimeter" and "the envelope area of the particle in the planar image being 200 μm² or less" was counted.

(2) Analysis of Morphological Characteristics of Fine particles and/or Fine particulate Complexes in Composition Before Ultrasonication ((Roughness×circularity)/Aspect Ratio)

The planar particle image analysis with a particle shape analyzer especially in carrying out analysis of "morphological characteristics" of fine particles and/or fine particulate complexes in the composition of one or more embodiments of the present invention before the ultrasonication was carried out according to the following method.

In analyzing morphological characteristics of fine particles and/or fine particulate complexes in the composition before the ultrasonication, PITA-4 from SEISHIN ENTERPRISE Co., Ltd. was used as a particle analyzer through dynamic image analysis method in which a suspension of particulate objects is allowed to flow in a flow cell, where a high pixel camera, which will be mentioned later, can be installed in the particle analyzer.

For a camera for photographing an image of particles, DMK33UX290 (from The Imaging Source Co., Ltd.) was used as an imaging camera that can photograph a planar image on which fine particles and/or fine particulate complexes are present with effective pixels of 1,920 (H)×1,080 (V) and with pixels more detailed than the pixel size of approximately 2.8 μm×2.8 μm. As an objective lens for photographing images of fine particles and/or fine particulate complexes, the one with a magnification of 4 was used, and images of fine particles and/or fine particulate complexes were photographed while allowing a sample to flow at an appropriate flow rate. With respect to the shape of the flow cell, a planarly extended cell was used. In photographing of images of fine particles and/or fine particulate complexes, conditions for the particle image analyzer were set to a degree where the focus is appropriately set, the shape of the fine particle and/or fine particulate complex can be clearly confirmed, and the contrast with the background is sufficient such that fine particles and/or fine particulate complexes in the composition before the ultrasonication can be clearly distinguished from the background. As a setting example of analysis conditions after acquisition of images of fine particles and/or fine particulate complexes, by using an imaging camera of 8-Bit grayscale, planar images were acquired with a LED strength of 100 and a camera gain of 100 db, and then, among them, 10,000 or more images of individual fine particles and/or fine particulate complexes were photographed with a brightness level of the image of fine particles and/or fine particulate complexes of 115 and a profile level of 160, and subjected to the analysis of morphological characteristics. With respect to a solvent or carrier liquid for the measurement, the measurement was carried out with isopropyl alcohol (IPA).

A sample was diluted by 1,000 times with a solvent used for the measurement, injected into a cell for the particle image measurement (synthetic quartz glass), and subjected to the image analysis of the shape of fine particles and/or fine particulate complexes.

For the photographing of images, photographing was carried out until the number of particles of fine particles and/or fine particulate complexes in the composition before the ultrasonication reached 10,000.

Specifically, with respect to the photographed image of fine particles and/or fine particulate complexes with 1,920 pixels×1,080 pixels (pixel size: 2.8 μm×2.8 μm), for images of fine particles and/or fine particulate complexes having a minimum pixel number of 15 pixels or more in the photographed planar image, the roughness, circularity and aspect ratio were measured for each of 10,000 images. Then, for a calculated value of "(roughness×circularity)/aspect ratio" of each fine particle and/or fine particulate complex, the $10^{th}$ percentile value in 10,000 specimens was calculated.

(3) Particle size Distribution (Modal Diameter, Specific Surface Area Per Unit Volume and Maximum particle size)

As a laser diffraction type particle size distribution measuring apparatus, Microtrac MT3300 EX 2 system from MicrotracBEL Corp. was used to measure the particle size distribution of the composition. As a solvent for the measurement, 95% ethanol (for example, a particular alcohol commercially available from Japan Alcohol Corporation, Traceable 95 First Grade with an alcohol content of 95) was used, and as a measurement application software, DMS II (Data Management System version 2, from MicrotracBEL Corp.) was used. In the measurement, the cleaning button of the measurement application software was pressed down to implement cleaning, the Setzero button of the software was then pressed down to implement zero adjustment, and a sample was directly introduced until entering a proper concentration range with sample loading. For Test Example 38, since it did not have flowability at ordinary temperature, the sample was introduced after heating it to 90° C. to bring out flowability.

For a sample not to be subjected to the ultrasonication, the concentration was adjusted to a proper range in two times of sample loading after introducing the sample, and immediately after the adjustment, laser diffraction was carried out at a flow rate of 60% and for a measuring time of 10 seconds, and the obtained result was used as a measured value. For a sample to be subjected to the ultrasonication, the concentration was adjusted to a proper range with sample loading after introducing the sample, and after the adjustment, by pressing down the ultrasonication button of the software, the ultrasonication was carried out with a frequency of 40 kHz and an output of 40 W for 3 minutes. After a degassing processing was carried out three times, the sample loading processing was carried out again after the ultrasonication. After it was confirmed that the concentration was in a proper range, laser diffraction was promptly carried out at a flow rate of 60% and for a measuring time of 10 seconds, and the obtained result was used as a measured value.

For measurement conditions, the measurement was carried out under conditions of distribution display: volume, refractive index of particle: 1.60, refractive index of solvent: 1.36, measuring upper limit (μm)=2,000.00 μm, and measuring lower limit (μm)=0.021 μm.

In one or more embodiments of the present invention, for the measurement of the particle size distribution for each channel, it was measured by using a particle size for each measurement channel described in Table 1 as the standard. The % particle frequency for each channel was determined by measuring, for each channel, the frequency of particles whose particle size is not more than the particle size defined for each channel and larger than the particle size defined for the next channel (for the largest channel within the measuring range, a particle size at the measuring lower limit), and by using the total frequency of all channels within the measuring range as a denominator. Specifically, the % particle frequency for each of 132 channels below was measured. With respect to the results obtained by the measurement, the particle size of a channel whose % particle frequency is the highest was defined as the modal diameter. When multiple channels having exactly the same % particle frequency are present, the particle size of a channel whose particle size is the smallest among them was employed as the modal diameter. In addition, among channels in which the % particle frequency was confirmed, the particle size of a channel for which the maximum particle size is defined was employed as the maximum particle size.

TABLE V

| Channel | Particle size (μm) |
|---|---|
| 1 | 2000.000 |
| 2 | 1826.000 |
| 3 | 1674.000 |
| 4 | 1535.000 |
| 5 | 1408.000 |
| 6 | 1291.000 |
| 7 | 1184.000 |
| 8 | 1086.000 |
| 9 | 995.600 |
| 10 | 913.000 |
| 11 | 837.200 |
| 12 | 767.700 |
| 13 | 704.000 |
| 14 | 645.600 |
| 15 | 592.000 |
| 16 | 542.900 |
| 17 | 497.800 |
| 18 | 456.500 |
| 19 | 418.600 |
| 20 | 383.900 |
| 21 | 352.000 |
| 22 | 322.800 |
| 23 | 296.000 |
| 24 | 271.400 |
| 25 | 248.900 |
| 26 | 228.200 |
| 27 | 209.300 |
| 28 | 191.900 |
| 29 | 176.000 |
| 30 | 161.400 |
| 31 | 148.000 |
| 32 | 135.700 |
| 33 | 124.500 |
| 34 | 114.100 |
| 35 | 104.700 |
| 36 | 95.960 |
| 37 | 88.000 |
| 38 | 80.700 |
| 39 | 74.000 |
| 40 | 67.860 |
| 41 | 62.230 |
| 42 | 57.060 |
| 43 | 52.330 |
| 44 | 47.980 |
| 45 | 44.000 |
| 46 | 40.350 |
| 47 | 37.000 |
| 48 | 33.930 |
| 49 | 31.110 |
| 50 | 28.530 |
| 51 | 26.160 |
| 52 | 23.990 |
| 53 | 22.000 |
| 54 | 20.170 |
| 55 | 18.500 |

TABLE V-continued

| Channel | Particle size (μm) |
|---|---|
| 56 | 16.960 |
| 57 | 15.560 |
| 58 | 14.270 |
| 59 | 13.080 |
| 60 | 12.000 |
| 61 | 11.000 |
| 62 | 10.090 |
| 63 | 9.250 |
| 64 | 8.482 |
| 65 | 7.778 |
| 66 | 7.133 |
| 67 | 6.541 |
| 68 | 5.998 |
| 69 | 5.500 |
| 70 | 5.044 |
| 71 | 4.625 |
| 72 | 4.241 |
| 73 | 3.889 |
| 74 | 3.566 |
| 75 | 3.270 |
| 76 | 2.999 |
| 77 | 2.750 |
| 78 | 2.522 |
| 79 | 2.312 |
| 80 | 2.121 |
| 81 | 1.945 |
| 82 | 1.783 |
| 83 | 1.635 |
| 84 | 1.499 |
| 85 | 1.375 |
| 86 | 1.261 |
| 87 | 1.156 |
| 88 | 1.060 |
| 89 | 0.972 |
| 90 | 0.892 |
| 91 | 0.818 |
| 92 | 0.750 |
| 93 | 0.688 |
| 94 | 0.630 |
| 95 | 0.578 |
| 96 | 0.530 |
| 97 | 0.486 |
| 98 | 0.446 |
| 99 | 0.409 |
| 100 | 0.375 |
| 101 | 0.344 |
| 102 | 0.315 |
| 103 | 0.289 |
| 104 | 0.265 |
| 105 | 0.243 |
| 106 | 0.223 |
| 107 | 0.204 |
| 108 | 0.187 |
| 109 | 0.172 |
| 110 | 0.158 |
| 111 | 0.145 |
| 112 | 0.133 |
| 113 | 0.122 |
| 114 | 0.111 |
| 115 | 0.102 |
| 116 | 0.094 |
| 117 | 0.086 |
| 118 | 0.079 |
| 119 | 0.072 |
| 120 | 0.066 |
| 121 | 0.061 |
| 122 | 0.056 |
| 123 | 0.051 |
| 124 | 0.047 |
| 125 | 0.043 |
| 126 | 0.039 |
| 127 | 0.036 |
| 128 | 0.033 |
| 129 | 0.030 |
| 130 | 0.028 |
| 131 | 0.026 |
| 132 | 0.023 |

(4) Collapsibility, (5) Deliciousness and (6) Acrid Taste Originating from Food Material For the sample of each composition obtained in Examples and Comparative Examples, one tablespoon of the sample mounted on a cracker ("Levain (R)" from YAMAZAKI BISCUITS CO., LTD.) was subjected to tasting, and an organoleptic test for evaluating the quality regarding the coloring of appearance before eating and the taste upon eating was carried out by the total number of 10 trained organoleptic inspectors. In this organoleptic test, evaluation was carried out for each of three items such as "collapsibility", "deliciousness" and "acrid taste originating from food material" with a full mark of 5. For the "collapsibility," palatabiiity for a specific texture, as if the sample breaks softly in the mouth, was evaluated with five grades: 5: collapsibility in the mouth is preferable; 4: collapsibility in the mouth is slightly preferable; 3: neutral; 2: collapsibility in the mouth is slightly unpreferable; and 1: collapsibility in the mouth is not preferable. For the "acrid taste originating from food material," palatabiiity for the acrid taste originating from a food material was evaluated with five grades: 5: hard to feel acrid taste originating from food material; 4: slightly hard to feel acrid taste originating from food material; 3: neutral; 2: slightly easy to feel acrid taste originating from food material; and 1: easy to feel acrid taste originating from food material. For the "deliciousness," comprehensive taste was evaluated with five grades: 5: delicious; 4: slightly delicious; 3: neutral; 2: slightly not delicious; and 1: not delicious. For each evaluation item, evaluation was carried out with a scheme in which each inspector selected one numeral closest to his/her own evaluation. In addition, totalization of the evaluation results was carried out by calculating the arithmetic mean value of scores of the total number of 10 inspectors.

In training of organoleptic inspectors, identification trainings like the following A) to C) were implemented to select inspectors who achieve particularly excellent grades, who have experiences in product development and a plenty of knowledge about the quality of foods such as taste and appearance, and who can make absolute evaluation on each organoleptic inspection item. As a result, an organoleptic inspection with objectivity was carried out by the total number of 10 inspectors:

A) identification test for taste qualities, in which, for each of five tastes (sweetness: taste of sugar, sour taste: taste of tartaric acid, umami: taste of sodium glutamate, saltiness: taste of sodium chloride, and bitterness: taste of caffeine), an aqueous solution having a concentration close to the threshold of each component is prepared, and among the total of seven samples using the above and two samples of distilled water, a sample with each taste is exactly identified;

B) identification test for concentration difference, in which concentration difference among five common salt aqueous solutions and acetic acid aqueous solutions having slightly different concentrations is exactly identified; and C) three-point identification test, in which, among the total of three samples: two soy sauces manufactured by Company A and one soy sauce manufactured by Company B, the soy sauce of Company B is exactly identified.

(7) Light Resistance and (8) Color Stability during Storage (Color After Storage at 40° C. for 1 month)

For the sample of each composition obtained in Examples, 50 g of the sample was filled in a transparent glass bottle, and its quality was evaluated.

For the "light resistance," the appearance of a sample stored under an illuminance of 20,000 lux for 14 days was compared with that of a sample stored in a cool dark place for evaluation.

For the "color after storage at 40° C. for 1 month," the appearance of a sample stored at 40° C. for 30 days was compared with that of a sample stored in a cool dark place for evaluation.

In this organoleptic test, evaluation was made by the total number of 10 trained organoleptic inspectors for two items such as "light resistance" and "color after storage at 40° C. for 1 month." The "light resistance" and "color after storage at 40° C. for 1 month" were evaluated with five grades: 5: color change is small, which is preferable; 4: color change is slightly small, which is slightly preferable; 3: color change can be recognized but within an acceptable range; 2: color change is slightly noticeable, which is slightly unpreferable; 1: color change is noticeable, which is unpreferable, with a scheme in which each inspector selected one numeral closest to his/her own evaluation. In addition, totalization of the evaluation results was carried out by calculating the arithmetic mean value of scores of the total number of 10 inspectors.

The results obtained are shown in Tables 2 to 9. Note that, as a result of carrying out particle image analysis of the sample before the ultrasonication, for all samples, at least 10,000 or more fine particles and/or fine particulate complex satisfying a particle size of 2.3 µm to 1,600 µmm in 1 $cm^3$ of the sample were confirmed.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

TABLE 2

| <Formulation> | | Test Example 1 | Test Example 2 | Test Example 3 | Test Example 4 | Test Example 5 | Test Example 6 | Test Example 7 | Test Example 8 | Test Example 9 | Test Example 10 | Test Example 11 | Test Example 12 | Test Example 13 | Test Example 14 |
|---|---|---|---|---|---|---|---|---|---|---|---|---|---|---|---|
| Dried carrot | Parts by mass | 500 | | | | | | | | | | | | | |
| Dried pumpkin | Parts by mass | | 500 | | | | | | | | | | | | |
| Roasted chickpea | Parts by mass | | | 500 | | | | | | | | | | | |
| Dried sweet corn | Parts by mass | | | | 200 | 350 | | | | | | | | | |
| Dried soybean | Parts by mass | | | | | | 750 | 500 | 500 | 500 | 500 | 500 | | | |
| Roasted macadamia | Parts by mass | | | | | | | | | | | | | | 1000 |
| Roasted sesame | Parts by mass | | | | | | | | | | | | | | |
| Dried tomato | Parts by mass | | | | | | | | | | | | | | |
| Dried green soybean | Parts by mass | | | | | | | | | | | | | | |
| Dried rice | Parts by mass | | | | | | | | | | | | | | |
| Roasted pistachio | Parts by mass | | | | | | | | | | | | | | |
| Raw avocado (undried) | Parts by mass | | | | | | | | | | | | | | |
| Dried avocado | Parts by mass | | | | | | | | | | | | | | |
| Olive oil | Parts by mass | 500 | 500 | 500 | 800 | 650 | 250 | 450 | 400 | 350 | 300 | 500 | 500 | 500 | |
| Cocoa butter | Parts by mass | | | | | | | | | | | | | | |
| Water | Parts by mass | | | | | | | 50 | 100 | 150 | 200 | | | | |

TABLE 2-continued

| | | | Test Example 1 | Test Example 2 | Test Example 3 | Test Example 4 | Test Example 5 | Test Example 6 | Test Example 7 | Test Example 8 | Test Example 9 | Test Example 10 | Test Example 11 | Test Example 12 | Test Example 13 | Test Example 14 |
|---|---|---|---|---|---|---|---|---|---|---|---|---|---|---|---|---|
| <Formulation> | | mass | | | | | | | | | | | | | | |
| | Total | Parts by mass | 1000 | 1000 | 1000 | 1000 | 1000 | 1000 | 1000 | 1000 | 1000 | 1000 | 1000 | 1000 | 1000 | 1000 |
| Fin | Pretreatment | | Wonder crusher | Jet mill | Jet mill | Jet mill | Jet mill | Jet mill | Jet mill | Jet mill | Jet mill | Jet mill | Wonder crusher | Pin mill | Pin mill | Wonder crusher |
| | Fine pulverization method | | — | — | Medium stirring mill (bead mill) | Medium stirring mill (bead mill) | Medium stirring mill (bead mill) | Medium stirring mill (bead mill) | Medium stirring mill (bead mill) | Medium stirring mill (bead mill) | Medium stirring mill (bead mill) | Medium stirring mill (bead mill) | — | — | Medium stirring mill (bead mill) | — |
| | Medium/size | | — | — | beads/φ 2 mm | beads/φ 2 mm | beads/φ 2 mm | beads/φ 2 mm | beads/φ 2 mm | beads/φ 2 mm | beads/φ 2 mm | beads/φ 2 mm | — | — | beads/φ 2 mm | — |
| | Treatment after fine pulverization | | Mixing powder with oil | Mixing powder with oil | — | — | — | — | — | — | — | — | Mixing powder with oil | Mixing powder with oil | — | Mixing powder with oil |
| | Treatment temperature (immediately after initiation) (T1) | °C. | — | — | 22 | 22 | 22 | 22 | 22 | 22 | 22 | 22 | — | — | 22 | — |
| | Treatment temperature (upon termination of treatment) (T2) | °C. | — | — | 36 | 44 | 42 | 34 | 35 | 32 | 31 | 29 | — | — | 52 | — |
| | Pressurized condition (1 minute after initiation) | MPa | 0 (ordinary pressure) | 0 (ordinary pressure) | 0.05 | 0.02 | 0.04 | 0.36 | 0.08 | 0.11 | 0.14 | 0.18 | 0 (ordinary pressure) | 0 (ordinary pressure) | 0.08 | 0 (ordinary pressure) |
| | Pressurized condition (upon termination of treatment) | MPa | 0 (ordinary pressure) | 0 (ordinary pressure) | 0.06 | 0.03 | 0.04 | 0.50 | 0.09 | 0.13 | 0.16 | 0.22 | 0 (ordinary pressure) | 0 (ordinary pressure) | 0.12 | 0 (ordinary pressure) |
| | Pressurized condition upon fine pulverization (highest) | MPa | 0 (ordinary pressure) | 0 (ordinary pressure) | 0.08 | 0.03 | 0.04 | 0.50 | 0.09 | 0.13 | 0.16 | 0.22 | 0 (ordinary pressure) | 0 (ordinary pressure) | 0.12 | 0 (ordinary pressure) |

TABLE 3

| | | Test Example 1 | Test Example 2 | Test Example 3 | Test Example 4 | Test Example 5 | Test Example 6 | Test Example 7 | Test Example 8 | Test Example 9 | Test Example 10 | Test Example 11 | Test Example 12 | Test Example 13 | Test Example 14 |
|---|---|---|---|---|---|---|---|---|---|---|---|---|---|---|---|
| | | <Analytical value> | | | | | | | | | | | | | |
| | Content of fine food particles (% by mass) | 75.1% | 75.1% | 76.2% | 30.1% | 55.5% | 85.1% | 70.1% | 71.9% | 73.2% | 72.4% | 72.2% | 70.0% | 74.1% | 70.0% |
| | Water content of entire composition (% by mass) | 8.6% | 5.0% | 4.8% | 2.1% | 5.0% | 7.4% | 9.8% | 14.7% | 19.9% | 25.1% | 3.0% | 2.9% | 2.6% | 1.4% |
| | Total oil/fat content (% by mass) | 52.3% | 53.4% | 55.4% | 84.5% | 54.5% | 30.0% | 50.0% | 44.4% | 39.7% | 34.6% | 61.0% | 62.1% | 63.5% | 78.4% |
| Before ultrasonication | Maximum particle size before ultrasonication (µm) | 2000.0 | 176.0 | 418.6 | 383.9 | 418.6 | 456.5 | 592.0 | 497.8 | 995.6 | 418.6 | 1408.0 | 352.0 | 296.0 | 2000.0 |
| | d50 before ultrasonication (µm) | 206.3 | 26.6 | 75.9 | 69.9 | 74.5 | 86.8 | 27.8 | 48.1 | 93.0 | 88.3 | 70.3 | 129.2 | 59.4 | 333.5 |
| | Modal diameter before ultrasonication (µm) | 228.2 | 33.9 | 95.6 | 88.0 | 80.7 | 104.7 | 13.1 | 80.7 | 74.0 | 176.0 | 913.0 | 161.4 | 80.7 | 1826.0 |
| | Specific surface area per unit volume before ultrasonication (m²/ml) | 0.056 | 0.335 | 0.292 | 0.313 | 0.304 | 0.292 | 0.419 | 0.253 | 0.103 | 0.097 | 0.196 | 0.065 | 0.427 | 0.273 |
| | "(Roughness × circularity)/aspect ratio" before ultrasonication (10th percentile value (10,000 specimens)) | 0.201 | 0.431 | 0.235 | 0.106 | 0.127 | 0.325 | 0.138 | 0.183 | 0.185 | 0.176 | 0.246 | 0.402 | 0.119 | 0.288 |
| After ultrasonication | Maximum particle size after ultrasonication (µm) | 2000.0 | 124.5 | 52.3 | 44.0 | 49.1 | 80.7 | 209.3 | 248.9 | 296.0 | 352.0 | 1408.0 | 352.0 | 31.1 | 1826.0 |
| | d50 after ultrasonication (µm) | 153.8 | 13.7 | 7.1 | 4.9 | 5.5 | 10.4 | 11.6 | 18.1 | 40.7 | 51.0 | 54.5 | 20.3 | 6.8 | 27.1 |
| | Modal diameter after ultrasonication (µm) | 135.7 | 18.5 | 7.1 | 5.5 | 6.0 | 11.0 | 9.3 | 11.0 | 52.3 | 52.3 | 592.0 | 40.4 | 7.1 | 31.1 |
| | Specific surface area per unit volume after ultrasonication (m²/ml) | 0.084 | 0.659 | 0.986 | 1.132 | 1.004 | 0.773 | 0.724 | 0.528 | 0.273 | 0.231 | 0.235 | 0.539 | 0.962 | 0.410 |
| | Percentage by which maximum particle size after ultrasonication decreases (%) | 0.0% | 29.3% | 87.5% | 88.5% | 88.3% | 82.3% | 64.6% | 50.0% | 70.3% | 15.9% | 0.0% | 0.0% | 89.5% | 8.7% |

TABLE 3-continued

| | Test Example 1 | Test Example 2 | Test Example 3 | Test Example 4 | Test Example 5 | Test Example 6 | Test Example 7 | Test Example 8 | Test Example 9 | Test Example 10 | Test Example 11 | Test Example 12 | Test Example 13 | Test Example 14 |
|---|---|---|---|---|---|---|---|---|---|---|---|---|---|---|
| compared with that before treatment (decreasing rate of maximum particle size) | | | | | | | | | | | | | | |
| <Results of organoleptic evaluation> | | | | | | | | | | | | | | |
| Light resistance | 3 | 1 | 4 | 5 | 5 | 4 | 5 | 5 | 4 | 4 | 1 | 1 | 5 | 4 |
| Collapsibility | 1 | 3 | 5 | 5 | 5 | 5 | 4 | 4 | 4 | 3 | 1 | 1 | 5 | 2 |
| Deliciousness | 2 | 4 | 5 | 5 | 5 | 5 | 4 | 4 | 4 | 3 | 2 | 3 | 5 | 2 |

TABLE 4

| <Formulation> | | Test Example 15 | Test Example 16 | Test Example 17 | Test Example 18 | Test Example 19 | Test Example 20 | Test Example 21 | Test Example 22 | Test Example 23 | Test Example 24 | Test Example 25 | Test Example 26 | Test Example 27 |
|---|---|---|---|---|---|---|---|---|---|---|---|---|---|---|
| Dried carrot | Parts by mass | | | | | | | | | 500 | 500 | 500 | | |
| Dried pumpkin | Parts by mass | | 1000 | | | | | 500 | | | | | | |
| Roasted chickpea | Parts by mass | | | 500 | 500 | | | | | | | | | |
| Dried sweet corn | Parts by mass | | | | 500 | 500 | | | | | | | | |
| Dried soybean | Parts by mass | | | | | | | | 500 | | | | | |
| Roasted macadamia | Parts by mass | 1000 | | | | | | | | | | | | |
| Roasted sesame | Parts by mass | | | | | | 1000 | | | | | | | |
| Dried tomato | Parts by mass | | | 500 | 500 | 500 | | | | | | | | |
| Dried green soybean | Parts by mass | | | | | | | | | | | | | |
| Dried rice | Parts by mass | | | | | | | | | | | | | |
| Roasted pistachio | Parts by mass | | | | | | | | | | | | 500 | |
| Raw avocado (undried) | Parts by mass | | | | | | | | | | | | | |
| Dried avocado | Parts by mass | | | | | | | | | | | | | 500 |
| Olive oil | Parts by mass | | | | | | | 500 | 500 | 500 | 500 | 500 | 500 | 500 |
| Cocoa butter | Parts by mass | | | | | | | | | | | | | |
| Water | Parts by mass | | | | | | | | | | | | | |

TABLE 4-continued

| | | | Test Example 15 | Test Example 16 | Test Example 17 | Test Example 18 | Test Example 19 | Test Example 20 | Test Example 21 | Test Example 22 | Test Example 23 | Test Example 24 | Test Example 25 | Test Example 26 | Test Example 27 |
|---|---|---|---|---|---|---|---|---|---|---|---|---|---|---|---|
| <Formulation> | Total | Parts by mass | 1000 | 1000 | 1000 | 1000 | 1000 | 1000 | 1000 | 1000 | 1000 | 1000 | 1000 | 1000 | 1000 |
| | Pretreatment | | Stone mill pulverization | Stone mill pulverization | Pin mill | Pin mill | Pin mill | Stone mill pulverization | Jet mill | Jet mill | Wonder crusher | Jet mill | Jet mill | Wonder crusher | Spray-dried powder |
| Fine | Fine pulverization method | | — | Medium stirring mill (bead mill) | — | Medium stirring mill (bead mill) | Medium stirring mill (bead mill) | Medium stirring mill (attritor) | — | Medium stirring mill (bead mill) | — | — | Medium stirring mill (bead mill) | — | — |
| | Medium/size | | — | beads/φ2 mm | — | beads/φ 2 mm | beads/φ 2 mm | balls/φ4 mm | — | beads/φ 2 mm | — | — | beads/φ 2 mm | — | — |
| | Treatment after fine pulverization | | Mixing powder with oil | — | Mixing powder with oil | — | — | — | Mixing powder with oil | — | Mixing powder with oil | Mixing powder with oil | — | Mixing powder with oil | Mixing powder with oil |
| | Treatment temperature (T1) (immediately after initiation) | °C | — | 22 | — | 22 | 22 | 22 | — | 22 | — | — | 22 | — | — |
| | Treatment temperature (T2) (upon termination of treatment) | °C | — | 48 | — | 36 | 40 | 65 | — | 37 | — | — | 38 | — | — |
| | Pressurized condition (1 minute after initiation) | MPa | 0 (ordinary pressure) | 0.14 | 0 (ordinary pressure) | 0.08 | 0.12 | 0 (ordinary pressure) | 0 (ordinary pressure) | 0.08 | 0 (ordinary pressure) | 0 (ordinary pressure) | 0.09 | 0 (ordinary pressure) | 0 (ordinary pressure) |
| | Pressurized condition (upon termination of treatment) | MPa | 0 (ordinary pressure) | 0.16 | 0 (ordinary pressure) | 0.08 | 0.14 | 0 (ordinary pressure) | 0 (ordinary pressure) | 0.08 | 0 (ordinary pressure) | 0 (ordinary pressure) | 0.10 | 0 (ordinary pressure) | 0 (ordinary pressure) |
| | Pressurized condition upon fine pulverization (highest) | MPa | 0 (ordinary pressure) | 0.16 | 0 (ordinary pressure) | 0.08 | 0.14 | 0 (ordinary pressure) | 0 (ordinary pressure) | 0.08 | 0 (ordinary pressure) | 0 (ordinary pressure) | 0.10 | 0 (ordinary pressure) | 0 (ordinary pressure) |

TABLE 5

|  |  | Test Example 15 | Test Example 16 | Test Example 17 | Test Example 18 | Test Example 19 | Test Example 20 | Test Example 21 | Test Example 22 | Test Example 23 | Test Example 24 | Test Example 25 | Test Example 26 | Test Example 27 |
|---|---|---|---|---|---|---|---|---|---|---|---|---|---|---|
|  |  | <Analytical value> | | | | | | | | | | | | |
|  | Content of fine food particles (% by mass) | 68.9% | 69.7% | 73.3% | 72.5% | 73.6% | 81.1% | 70.2% | 71.2% | 71.2% | 74.1% | 73.1% | 73.9% | 74.5% |
|  | Water content of entire composition (% by mass) | 1.3% | 1.2% | 4.2% | 3.2% | 3.0% | 2.5% | 4.3% | 4.0% | 3.3% | 3.1% | 2.9% | 4.7% | 4.4% |
|  | Total oil/fat content (% by mass) | 77.8% | 76.9% | 53.0% | 53.3% | 53.0% | 55.3% | 52.0% | 51.1% | 51.3% | 51.3% | 51.0% | 52.0% | 52.0% |
| Before ultrasonication | Maximum particle size before ultrasonication (μm) | 418.6 | 296.0 | 418.6 | 352.0 | 418.6 | 352.0 | 418.6 | 352.0 | 2000.0 | 322.8 | 352.0 | 2000.0 | 592.0 |
|  | d50 before ultrasonication (μm) | 121.6 | 92.8 | 129.5 | 144.6 | 129.2 | 166.5 | 112.8 | 79.3 | 335.5 | 103.3 | 30.7 | 345.7 | 63.5 |
|  | Modal diameter before ultrasonication (μm) | 135.7 | 96.0 | 191.9 | 148.0 | 135.7 | 176.0 | 114.1 | 80.7 | 352.0 | 114.1 | 31.1 | 383.9 | 52.3 |
|  | Specific surface area per unit volume before ultrasonication (m²/ml) | 0.058 | 0.071 | 0.062 | 0.045 | 0.049 | 0.039 | 0.058 | 0.110 | 0.055 | 0.066 | 0.255 | 0.060 | 0.107 |
|  | "(Roughness × circularity)/aspect ratio" before ultrasonication (10th percentile value (10,000 specimens)) | 0.422 | 0.063 | 0.341 | 0.319 | 0.118 | 0.225 | 0.415 | 0.173 | 0.192 | 0.419 | 0.093 | 0.237 | 0.511 |
| After ultrasonication | Maximum particle size after ultrasonication (μm) | 209.3 | 88.0 | 704.0 | 248.9 | 176.0 | 352.0 | 148.0 | 104.7 | 2000.0 | 209.3 | 114.1 | 2000.0 | 352.0 |
|  | d50 after ultrasonication (μm) | 24.0 | 13.1 | 33.0 | 22.8 | 19.9 | 13.9 | 20.5 | 11.4 | 316.9 | 25.3 | 17.2 | 332.6 | 71.2 |
|  | Modal diameter after ultrasonication (μm) | 28.5 | 22.0 | 33.9 | 28.5 | 24.0 | 7.1 | 31.1 | 14.3 | 383.9 | 44.0 | 24.0 | 191.9 | 80.7 |
|  | Specific surface area per unit volume after ultrasonication (m²/ml) | 0.472 | 0.805 | 0.295 | 0.420 | 0.480 | 0.650 | 0.537 | 0.758 | 0.206 | 0.403 | 0.489 | 0.100 | 0.143 |
|  | Percentage by which maximum particle size after ultrasonication decreases compared with that before treatment (%) | 50.0% | 70.3% | −68.2% | 29.3% | 58.0% | 0.0% | 64.6% | 70.3% | 0.0% | 35.2% | 67.6% | 0.0% | 40.5% |

TABLE 5-continued

| | Test Example 15 | Test Example 16 | Test Example 17 | Test Example 18 | Test Example 19 | Test Example 20 | Test Example 21 | Test Example 22 | Test Example 23 | Test Example 24 | Test Example 25 | Test Example 26 | Test Example 27 |
|---|---|---|---|---|---|---|---|---|---|---|---|---|---|
| (decreasing rate of maximum particle size) | | | | | | | | | | | | | |
| | | | | <Results of organoleptic evaluation> | | | | | | | | | |
| Light resistance | 1 | 5 | 3 | 4 | 5 | 4 | 1 | 5 | 2 | 1 | 5 | 3 | 1 |
| Collapsibility | 4 | 5 | 1 | 4 | 5 | 1 | 5 | 5 | 1 | 3 | 5 | 1 | 4 |
| Deliciousness | 3 | 5 | 3 | 5 | 5 | 1 | 4 | 5 | 2 | 3 | 5 | 2 | 3 |

TABLE 6

| <Formulation> | | Test Example 28 | Test Example 29 | Test Example 30 | Test Example 31 | Test Example 32 | Test Example 33 | Test Example 34 | Test Example 35 | Test Example 36 | Test Example 37 | Test Example 38 | Test Example 39 |
|---|---|---|---|---|---|---|---|---|---|---|---|---|---|
| Dried carrot | Parts by mass | | | | | | | | | | | | |
| Dried pumpkin | Parts by mass | | | | | | | | | | | | |
| Roasted chickpea | Parts by mass | | | | | | | | | | | | |
| Dried sweet corn | Parts by mass | | | | | | | | | | | | |
| Dried soybean | Parts by mass | | | | | | | | | | | | |
| Roasted macadamia | Parts by mass | | | | | | | | | | | | |
| Roasted sesame | Parts by mass | | | | | | | | | | | | |
| Dried tomato | Parts by mass | 500 | | | | | | | | | | | |
| Dried green soybean | Parts by mass | | 500 | | | | | | | | | | |
| Dried rice | Parts by mass | | | 500 | | | | | | | | | |
| Roasted pistachio | Parts by mass | | | | 500 | | | | | | | | |
| Raw avocado (undried) | Parts by mass | | | | | 500 | | | | | | | |
| Dried avocado | Parts by mass | | | | | | 1000 | | | | | | |
| Dried chicken breast meat | Parts by mass | | | | | | | 1000 | | | | | 400 |
| Common salt | Parts by mass | | | | | | | | 1000 | | | | 100 |
| Rapeseed oil | Parts by mass | | | | | | | | | 1000 | 1000 | | 500 |

| <Formulation> | | Test Example 28 | Test Example 29 | Test Example 30 | Test Example 31 | Test Example 32 | Test Example 33 | Test Example 34 | Test Example 35 | Test Example 36 | Test Example 37 | Test Example 38 | Test Example 39 |
|---|---|---|---|---|---|---|---|---|---|---|---|---|---|
| Olive oil | Parts by mass | 500 | 500 | 500 | 500 | 500 | | | | | | | |
| Cocoa butter | Parts by mass | | | | | | | | | | | 500 | |
| Water | Parts by mass | | 500 | 500 | 500 | 500 | | | | | | | |
| Total | Parts by mass | 1000 | 1000 | 1000 | 1000 | 1000 | 1000 | 1000 | 1000 | 1000 | 1000 | 1000 | 1000 |
| Pretreatment | | Spray-dried powder | Pin mill | Pin mill | Pin mill | Pin mill | Stone mill pulverization | Stone mill pulverization | Wonder crusher | Stone mill pulverization | Stone mill pulverization | Jet mill | Stone mill pulverization |
| Fine pulverization method | | Medium stirring mill (bead mill) | — | Medium stirring mill (bead mill) | — | Medium stirring mill (bead mill) | — | Medium stirring mill (bead mill) | — | — | Medium stirring mill (bead mill) | Medium stirring mill (bead mill) | Medium stirring mill (bead mill) |
| Medium/size | | beads/φ2 mm | — | beads/φ2 mm | — | beads/φ2 mm | — | beads/φ2 mm | — | — | beads/φ2 mm | beads/φ2 mm | beads/φ2 mm |
| Treatment after fine pulverization | | — | Mixing powder with oil | — | Mixing powder with oil | — | Mixing powder with oil | — | Mixing powder with oil | Mixing powder with oil | — | Tempering treatment implemented after fine pulverization processing | — |
| Treatment temperature (immediately after initiation) (T1) | °C. | 22 | — | 22 | — | 22 | — | 22 | — | — | 22 | 40 | 23 |
| Treatment temperature (upon termination of treatment) (T2) | °C. | 37 | — | 36 | — | 38 | — | 42 | — | — | 41 | 56 | 32 |
| Pressurized condition (1 minute after initiation) | MPa | 0.38 | 0 (ordinary pressure) | 0.10 | 0 (ordinary pressure) | 0.07 | 0 (ordinary pressure) | 0.16 | 0 (ordinary pressure) | 0 (ordinary pressure) | 0.18 | 0.13 | 0.05 |
| Pressurized condition (upon termination | MPa | 0.42 | 0 (ordinary pressure) | 0.12 | 0 (ordinary pressure) | 0.07 | 0 (ordinary pressure) | 0.18 | 0 (ordinary pressure) | 0 (ordinary pressure) | 0.18 | 0.15 | 0.14 |

TABLE 6-continued

| <Formulation> | | Test Example 28 | Test Example 29 | Test Example 30 | Test Example 31 | Test Example 32 | Test Example 33 | Test Example 34 | Test Example 35 | Test Example 36 | Test Example 37 | Test Example 38 | Test Example 39 |
|---|---|---|---|---|---|---|---|---|---|---|---|---|---|
| of treatment) Pressurized condition upon fine pulverization (highest) | MPa | 0.42 | 0 (ordinary pressure) | 0.12 | 0 (ordinary pressure) | 0.07 | 0 (ordinary pressure) | 0.18 | 0 (ordinary pressure) | 0 (ordinary pressure) | 0.18 | 0.15 | 0.14 |

TABLE 7

|  |  |  | Test Example 28 | Test Example 29 | Test Example 30 | Test Example 31 | Test Example 32 | Test Example 33 | Test Example 34 | Test Example 35 | Test Example 36 | Test Example 37 | Test Example 38 | Test Example 39 |
|---|---|---|---|---|---|---|---|---|---|---|---|---|---|---|
|  |  |  | <Analytical value> | | | | | | | | | | | |
| Before ultrasonication | Content of fine food particles | % by mass | 75.0% | 73.2% | 74.6% | 72.1% | 71.6% | 81.8% | 82.8% | 87.7% | 78.8% | 77.8% | 88.9% | 61.2% |
|  | Water content of entire composition | % by mass | 4.3% | 4.5% | 4.4% | 9.8% | 9.5% | 4.3% | 3.4% | 73.0% | 9.6% | 8.9% | 3.0% | 5.4% |
|  | Total oil/fat content | % by mass | 52.1% | 75.3% | 77.6% | 52.5% | 53.0% | 56.5% | 58.9% | 20.0% | 55.0% | 57.3% | 55.5% | 57.0% |
|  | Maximum particle size before ultrasonication | μm | 418.6 | 418.6 | 352.0 | 296.0 | 209.3 | 592.0 | 418.6 | 2000.0 | 704.0 | 592.0 | 592.0 | 352.0 |
|  | d50 before ultrasonication | μm | 105.1 | 92.6 | 127.5 | 46.6 | 29.1 | 41.3 | 115.4 | 300.1 | 276.7 | 82.2 | 90.1 | 123.3 |
|  | Modal diameter before ultrasonication | μm | 114.1 | 191.9 | 148.0 | 52.3 | 44.0 | 57.1 | 161.4 | 322.8 | 296.0 | 209.3 | 248.9 | 135.7 |
|  | Specific surface area per unit volume before ultrasonication | m²/ml | 0.076 | 0.131 | 0.130 | 0.163 | 0.308 | 0.482 | 0.354 | 0.019 | 0.024 | 0.255 | 0.361 | 0.083 |
|  | "(Roughness × circularity)/aspect ratio" before ultrasonication | 10th percentile value (10,000 specimens) | 0.075 | 0.411 | 0.102 | 0.402 | 0.152 | 0.435 | 0.097 | 0.153 | 0.429 | 0.028 | 0.100 | 0.347 |
| After | Maximum particle size after ultrasonication | μm | 124.5 | 592.0 | 148.0 | 352.0 | 148.0 | 497.8 | 62.2 | 1674.0 | 592.0 | 124.5 | 62.2 | 62.2 |
|  | d50 after ultrasonication | μm | 13.2 | 42.8 | 11.3 | 46.3 | 14.7 | 11.6 | 6.1 | 89.3 | 48.0 | 11.4 | 6.3 | 9.5 |
|  | Modal diameter after ultrasonication | μm | 14.3 | 40.4 | 12.0 | 62.2 | 18.5 | 3.9 | 6.0 | 228.2 | 161.4 | 13.1 | 6.5 | 12.0 |
|  | Specific surface area per unit volume after ultrasonication | m²/ml | 0.536 | 0.227 | 0.686 | 0.201 | 0.526 | 1.032 | 1.285 | 0.232 | 0.286 | 0.709 | 1.086 | 0.920 |
|  | Percentage by which maximum particle size after ultrasonication decreases compared with that before treatment (decreasing rate of maximum particle size) | % | 70.3% | −41.4% | 58.0% | −18.9% | 29.3% | 15.9% | 85.1% | 16.3% | 15.9% | 79.0% | 89.5% | 82.3% |

TABLE 7-continued

| | Test Example 28 | Test Example 29 | Test Example 30 | Test Example 31 | Test Example 32 | Test Example 33 | Test Example 34 | Test Example 35 | Test Example 36 | Test Example 37 | Test Example 38 | Test Example 39 |
|---|---|---|---|---|---|---|---|---|---|---|---|---|
| <Results of organoleptic evaluation> | | | | | | | | | | | | |
| Light resistance | 5 | 1 | 5 | 1 | 5 | 1 | 5 | 2 | 1 | 5 | 5 | 4 |
| Collapsibility | 5 | 1 | 5 | 1 | 4 | 3 | 5 | 1 | 3 | 5 | 5 | 5 |
| Deliciousness | 5 | 2 | 5 | 2 | 5 | 2 | 5 | 2 | 3 | 5 | 5 | 5 |

TABLE 8

| <Formulation> | | Test Example 1 | Test Example 2 | Test Example 3 | Test Example 6 | Test Example 11 | Test Example 12 | Test Example 13 | Test Example 14 |
|---|---|---|---|---|---|---|---|---|---|
| Percentage of particles satisfying condition A and condition B before ultrasonication: (A) envelope perimeter of particle in planar image is 95% or less of perimeter; and (B) envelope area of particle in planar image is 200 µm² or less | % | 0.7% | 4.6% | 10.6% | 1.5% | 0.7% | 4.3% | 10.9% | 3.3% |
| <Results of organoleptic evaluation> | | | | | | | | | |
| Color after storage at 40° C. for 1 month | | 1 | 4 | 5 | 4 | 1 | 4 | 5 | 3 |
| Acrid taste originating from food material | | 3 | 4 | 5 | 4 | 3 | 4 | 4 | 3 |

TABLE 9

| <Formulation> | | Test Example 15 | Test Example 16 | Test Example 17 | Test Example 18 | Test Example 19 | Test Example 20 | Test Example 21 | Test Example 22 | Test Example 23 | Test Example 24 | Test Example 25 |
|---|---|---|---|---|---|---|---|---|---|---|---|---|
| Percentage of particles satisfying condition A and condition B before ultrasonication: (A) envelope perimeter of particle in planar image is 95% or less of perimeter; and (B) envelope area of particle in planar image is 200 µm² or less | % | 9.9% | 11.2% | 4.3% | 5.6% | 8.9% | 26.0% | 3.5% | 4.6% | 1.9% | 4.3% | 6.5% |
| <Results of organoleptic evaluation> | | | | | | | | | | | | |
| Color after storage at 40° C. for 1 month | | 5 | 5 | 4 | 4 | 5 | 5 | 4 | 4 | 2 | 4 | 5 |
| Acrid taste originating from food material | | 4 | 4 | 4 | 4 | 4 | 1 | 4 | 5 | 3 | 4 | 5 |

What is claimed is:

1. A method for producing a food product, comprising:

preparing a mixture comprising one or more dried food ingredients and at least one oil or fat, wherein a total fat content in the mixture is 34% by mass or more; and wet pulverizing the dried food ingredients in the mixture to produce a food composition containing fine particles, wherein the food composition comprises the at least one oil or fat and 20% to 98% by mass of the fine particles of the dried food ingredients and/or particulate complexes thereof, and wherein the food composition has a water content of 20% by mass or less;

wherein:

the wet pulverization is performed under a pressurized condition with a maximum pressure of 0.01 to 1 MPa and under a rising temperature condition satisfying the following equation:

$$T1+1<T2<T1+50$$

T1 is a temperature of the mixture at initiation of the wet pulverization, and T2 is the temperature of the mixture at termination of the wet pulverization of 31° C. or above, the fine particles and/or the particulate complexes have a maximum size of larger than 100 µm, and the fine particles and/or the particulate complexes have the following properties:

after being subjected to an ultrasonication treatment at a frequency of 40 kHz and an output of 40 W for 180 seconds, the fine particles and/or the particulate complexes after the ultrasonication treatment have a modal diameter of 0.3 to 200 µm and the maximum particle size decreased by 10% or more; and after 10,000 of the fine particles and/or the fine particulate complexes are subjected to analysis with a particle shape image analyzer, a $10^{th}$ percentile value of a numerical value N for each fine particle and/or fine particulate complex is 0.40 or less, wherein N is calculated by the following equation:

$$N(\text{roughness} \times \text{circularity})/\text{aspect ratio}.$$

2. The method according to claim 1, wherein the wet pulverization is performed by a device selected from the group consisting of a medium stirring mill and a high-pressure homogenizer.

3. The method according to claim 1, wherein the wet pulverization is a one-pass treatment performed less than 30 minutes.

4. The method according to claim 1, wherein the food composition comprises 1% or more of particles satisfying the following:

when the particles are subjected to analysis with a particle shape image analyzer, an envelope perimeter of the particle in a planar image is 95% or less of a perimeter of the particle and an envelope area of the particle in a planar image is 200 µm2 or less.

5. The method according to claim 1, wherein, after the food composition is subjected to the ultrasonication treatment, a specific surface area per unit volume of the fine particles and/or the fine particulate complexes is increased by 1.6 times or more, wherein the specific surface area per unit volume after the ultrasonication treatment is 0.10 $m^2$/mL or more.

6. The method according to claim 1, wherein, after the food composition is subjected to the ultrasonication treatment, the maximum particle size is decreased to 30% to 95% of the maximum particle size before the ultrasonication treatment.

7. The method according to claim 1, wherein the fine particles and/or the particulate complexes obtained after the wet pulverization have a modal diameter of 20 to 400 µm.

8. The method according to claim 1, wherein the dried food ingredients are selected from the group consisting of seeds, grains, legumes, vegetables, fruits, spices, animal meat, and algae.

9. The method according to claim 1, wherein the dried food ingredients have a water activity value of 0.95 or less.

10. The food product produced by the method according to claim 1, wherein the food product comprises the food composition.

* * * * *

UNITED STATES PATENT AND TRADEMARK OFFICE
CERTIFICATE OF CORRECTION

| | |
|---|---|
| PATENT NO. | : 11,589,604 B2 |
| APPLICATION NO. | : 16/549258 |
| DATED | : February 28, 2023 |
| INVENTOR(S) | : Tatsuya Higuchi et al. |

It is certified that error appears in the above-identified patent and that said Letters Patent is hereby corrected as shown below:

In the Claims

At Column 65, Claim number 4, Line number 3, "µm2" should read -- $\mu m^2$ --.

Signed and Sealed this
Thirtieth Day of May, 2023

Katherine Kelly Vidal
*Director of the United States Patent and Trademark Office*